(12) United States Patent
Ikeda et al.

(10) Patent No.: US 7,900,543 B2
(45) Date of Patent: Mar. 8, 2011

(54) PUNCH PRESS, METHOD OF REPLACING PUNCH AND DIE FOR PUNCH PRESS, AND PUNCH SYSTEM

(75) Inventors: Nobuyuki Ikeda, Isehara (JP); Yoshihisa Ishiwata, Isehara (JP); Jun Wakao, Isehara (JP)

(73) Assignee: Amada Company, Limited, Kanagawa (JP)

( * ) Notice: Subject to any disclaimer, the term of this patent is extended or adjusted under 35 U.S.C. 154(b) by 1093 days.

(21) Appl. No.: 10/415,343

(22) PCT Filed: Nov. 1, 2001

(86) PCT No.: PCT/JP01/09589
§ 371 (c)(1), (2), (4) Date: May 2, 2003

(87) PCT Pub. No.: WO02/36283
PCT Pub. Date: May 10, 2002

(65) Prior Publication Data
US 2004/0045424 A1 Mar. 11, 2004

(30) Foreign Application Priority Data

Nov. 6, 2000 (JP) ............... P2000-337668
Nov. 6, 2000 (JP) ............... P2000-337695

(51) Int. Cl.
*B21D 5/01* (2006.01)

(52) U.S. Cl. .............. 83/563; 83/623; 83/532; 83/639.1; 83/549

(58) Field of Classification Search ............ 83/563, 83/623, 639.1, 698.91, 532, 561, 549–552
See application file for complete search history.

(56) References Cited

U.S. PATENT DOCUMENTS

| 3,548,700 | A | * | 12/1970 | Herzog et al. | 83/698.91 |
| 3,678,562 | A | * | 7/1972 | Leibinger | 483/1 |
| 4,141,133 | A | * | 2/1979 | Grinage | 483/9 |
| 4,486,941 | A | * | 12/1984 | Scott et al. | 483/29 |
| 4,624,165 | A | * | 11/1986 | Bredow et al. | 83/685 |

(Continued)

FOREIGN PATENT DOCUMENTS

JP 62127321 8/1987

(Continued)

OTHER PUBLICATIONS

English Language Abstract of JP Appln. No. 2000-61550.

(Continued)

*Primary Examiner* — Boyer D Ashley
*Assistant Examiner* — Omar Flores-Sánchez
(74) *Attorney, Agent, or Firm* — Greenblum & Bernstein, P.L.C.

(57) ABSTRACT

A punch press provided with a punch and die set taking-out/taking-in apparatus 291; a punch taking-out/taking-in arm 367 for performing taking-out/taking-in of a punch P; and a die taking-out/taking-in arm 369 for performing taking-out/taking-in of a die D, wherein taking-out/taking-in of many punches P, dies D accommodated in a punch and die set accommodating portion 282 of a rack 283 is performed by pivoting a punch holding arm 279 which holds a punch P and a die holding arm 281 which holds a die D in a punch and die set exchanging apparatus 23 forward or backward; and delivery of a die is performed between the punch and die set taking-out/taking-in apparatus 291 and the punch and die set exchanging apparatus 23.

4 Claims, 31 Drawing Sheets

U.S. PATENT DOCUMENTS

| | | | |
|---|---|---|---|
| 4,869,141 A * | 9/1989 | Klingel | 83/49 |
| 5,215,513 A | 6/1993 | Maynard et al. | |
| 5,325,755 A | 7/1994 | Morita | |
| 5,342,276 A | 8/1994 | Fujiwara et al. | |
| 5,346,454 A | 9/1994 | Hayashi | |
| 5,350,347 A | 9/1994 | Fujiwara et al. | |
| 5,451,195 A | 9/1995 | Fujiwara et al. | |
| 5,894,754 A * | 4/1999 | Sartorio | 72/422 |
| 6,200,246 B1 * | 3/2001 | Perazzolo | 483/28 |
| 6,408,726 B1 * | 6/2002 | Taijonlahti et al. | 83/563 |

FOREIGN PATENT DOCUMENTS

| | | |
|---|---|---|
| JP | 06099232 | 4/1994 |
| JP | 6114462 | 4/1994 |
| JP | 7132332 | 5/1995 |
| JP | 9024430 | 1/1997 |
| JP | 2000061550 | 2/2000 |
| JP | 2000126831 | 5/2000 |

OTHER PUBLICATIONS

English Lanugage Abstract of JP Appln. No. 06-114462.
English Language Abstract of JP Appln. No. 07-132332.
English Language Abstract of JP Appln. No. 09-024430.
English Language Abstract of JP Appln. No. 2000-126831.
English Language Abstract of JP Appln. No. 06-099232.

* cited by examiner

PUNCH PRESS, METHOD OF REPLACING PUNCH AND DIE FOR PUNCH PRESS, AND PUNCH SYSTEM

TECHNICAL FIELD

The present invention relates to a punch press for performing punching work on a workpiece in cooperation of a punch and a die, a punch/die exchanging method for to a punch press, and a punch system.

BACKGROUND ART

In FIG. 1, a turret punch press 501 serving as a punch press which is conventionally well-known is shown. The turret punch press 501 is provided in a standing manner with a frame 503 having a gap portion G at a central portion thereof, and an upper portion turret 505U which is supported at an upper portion frame 503U in a rotationally indexable manner and is equipped with a plurality of punches P is provided at the gap portion G. Further, a lower portion turret 505L which is equipped with a plurality of dies D (refer to FIG. 2 to FIG. 5) is provided in a rotationally indexable manner on a lower portion frame 503L so as to opposed to the upper portion turret 505U. The upper portion turret 505U and the lower portion turret 505L are rotated synchronously by a driving mechanism such as a rotating belt 509 rotated by a motor 507 or the like.

Further, a working table 511 which movably supports a workpiece W is provided at the gap portion G. A carriage base 519 which can be moved and positioned in a Y-axis direction via a Y-axis ball nut 517 according to rotation of a Y-axis ball screw 515 performed by a Y-axis motor 513. An X carriage 521 which can be moved and positioned in an X-axis direction is provided on the carriage base 519, and workpiece clampers 523 for clamping a workpiece W are provided on the X carriage 521 such that an interval therebetween is adjustable.

Incidentally, a hydraulic unit 525 for driving a driving apparatus, an NC console 527 for controlling positioning of a workpiece W or rotational indexing of the upper portion turret 505U and the lower portion turret 505L, or the hydraulic unit 525, and the like are provided in the vicinity of the turret punch press 501.

With the above constitution, the upper portion turret 505U and the lower portion turret 505L are rotated to index the punch P and the die D to be used to a working position K, and the carriage base 519 is moved in the Y-axis direction and the X carriage 521 is moved in the X-axis direction, so that a working point in the workpiece W clamped by the workpiece clampers 523 is indexed to the working position K. Then, the punch P is actuated in a punching manner by an unillustrated driving apparatus so that a punching working is performed in cooperation of the punch P and the die D.

However, as shown in FIG. 2, in the above-described turret punch press 501, since a feed clear d between the upper portion turret 505U and the lower portion turret 505L is small (for example, 20 mm), there is a possibility that in a working where a warp occurs in a workpiece W, the workpiece W is caught by dies equipped in the upper and lower portion turrets 505U, 505L so that the workpiece W is crushed.

As shown in FIG. 3, also, since it is difficult to move all the dies D equipped on the lower portion turret 505L synchronously in a vertical direction at a time of movement of a workpiece W, there is a problem that a back face of the workpiece W is injured by a die D equipped on the lower portion turret 505L.

Furthermore, in case of using the turrets 505U, 505L, since a plurality of dies AAA are arranged on a pass line, a formed portion 529 of a workpiece W interferes with an adjacent punch and die set to be crushed or injured in case that a forming work, and particularly a downward forming work is conducted on the workpiece W, as shown in FIG. 4. For this reason, since the downward forming is particularly conducted in another step, or such a movement or working order that the interference can be avoided is edited manually by devising a program, there is a problem that a working efficiency is lowered due to occurrence of a skilled work required.

That is, in an automatic programming apparatus, a movement locus is determined such that a working time, namely a material movement distance to the next working coordinates is made shortest, but it becomes impossible to automate a program, because such a movement locus that a problem of a catching or the like can be solved can not be considered.

Further, as shown in FIG. 5, in the turret punch press 501, since a relief clearance is provided such that a punched-out scrap is not caught by a disc support 531 supporting the lower portion turret 505L from its lower side at a time of working, there is a problem that the punched-out material can not be sucked effectively.

Moreover, in case that indexing functions for angular direction of each punch and die set (auto-indexes) are provided on the upper and lower portion turrets 505U, 505L, there is a problem that parts such as a worm gear for indexing and the like increases, which makes the turret punch press 501 expensive. Further, since a space is occupied by the gear or the like, the number of punch and die set stations is largely reduced (to about a half of the number), which causes a case that the working can not be conducted unless punch and die set exchanging is performed. As a result, there is a problem that productivity reduction is caused.

In order to solve these various problems, a punch press with a NC of a single head constitution where the punch P and the die D are mounted in one press mechanism is also used without using the upper and lower portion turrets 505U, 505L.

However, in the above-described turret punch press 501, there are various problems but there is a large advantage that a plurality of dies can be held and a punch and die set selection time is short (usually, 3 seconds or less) owing to use of the upper and lower turrets 505U, 505L so that a high productivity can be achieved. On the other hand, since only one punch and die set is usually held in the single head constitution, there is a problem that die exchange must frequently be performed in a sheet working of a plate metal using a plurality of dies.

For this reason, a punch and die set called a multi-tool where a plurality of dies are equipped in one punch and die set is also used, but since the punch and die set is constituted such that other dies are built in one punch and die set, there is a problem that dies other than a punch and die set having a small size can not be equipped.

Further, in case that one punch and die set in the multi-tool is selected according to a program and there is not a punch and die set to be used next in the multi-tool, the punch and die set must be exchanged to another punch and die set, which is not so effective for reduction of a punch and die set exchanging time.

Furthermore, the multi-tool is estimated high regarding a point that the number of held punch and die sets is increased. However, since workpiece dampers can not be moved near a punch and die set due to a relationship where dies with a small size have been structurally equipped in one main punch and die set frame, there is a defect that a region which can not be worked (a dead zone) increases, and there is a problem that the dead zone restrains a program, which makes it difficult to use the multi-tool in a real working.

On the other hand, in the single head constitution, since one punch and die set is merely held usually, a punch and die set accommodating apparatus accommodating a plurality of dies is required in a sheet working of a plate metal using a plurality of dies, in which there is a problem that a punch and die set accommodating apparatus which accommodates many dies is required, which results in large-sizing of the apparatus. Moreover, since dies must frequently be exchanged, there is a problem that working efficiency is reduced.

The present invention has been made in order to solve the above-described problems, and a first object thereof is to provide a punch press which can perform punch and die set exchanging rapidly and a punch/die exchanging method for a punch press.

A second object of the present invention is to provide a punch system which can accommodate many dies and can perform efficient punching work by conducting punch and die set exchanging rapidly.

DISCLOSURE OF THE INVENTION

In order to achieve the above-described first object, a punch press of the present invention based on a first aspect includes: an upper portion main shaft which is provided so as to be movable vertically and rotatable and which supports a punch in an attachable/detachable/exchangeable manner; and a lower portion main shaft which is provided so as to be movable vertically and rotatable and which supports a die corresponding to the punch in an attachable/detachable and exchangeable manner, wherein the upper portion main shaft is provided so as to be capable of ascending from a working height position for performing press working on a workpiece to a punch exchange height position for performing punch attaching/detaching/exchanging; and the lower portion main shaft is provided so as to be capable of descending from a working height position for performing press working on a workpiece to a die exchange height position for performing die attaching/detaching/exchanging.

With the above-described constitution, at a time of working, the upper portion main shaft is descended and positioned at the working height position, and the lower portion main shaft is positioned at the working height position so that working is performed. Then, at a time of punch and die set exchanging, the upper portion main shaft is ascended and positioned at the punch exchange height position and the lower portion main shaft is descended and positioned at the die exchange height position so that exchange of a punch and a die is performed.

Accordingly, a punch and a die can be exchanged simultaneously and rapidly regardless of whether or not there is a workpiece between the punch and the die.

In a punch press of this invention based on a second aspect according to the first aspect, the upper portion main shaft is provided with a punch clamper which can grasp a punch and a plate presser supporting member movable vertically which can support a plate presser; and the upper portion main shaft is provided with a fluid pressure cylinder which can pressurize the plate presser supporting member.

Accordingly, in the upper portion main body, a punch is grasped by the punch damper and the plate presser is moved vertically via the plate presser supporting member by the fluid pressure cylinder. In addition, the plate presser supporting member is descended by the fluid pressure cylinder and the plate presser is pressurized at a time of working.

In other words, in the upper portion main shaft, since the punch can securely be grasped and released by the punch clamper, and the plate presser can be moved vertically via the plate presser supporting member by the fluid pressure cylinder, a pressing force can be set according to the plate thickness of the workpiece.

In a punch press of this invention based on a third aspect according to the first aspect or the second aspect, the lower portion main shaft is provided with a fluid pressure cylinder which can push the die up; and a piston rod in the fluid pressure cylinder is formed in a hollow shape so as to be capable of abutting on a lower face of the die.

Accordingly, in the lower portion main shaft, since the piston rod of the fluid pressure cylinder which abuts on the die to moves it vertically is formed in a cylindrical shape, a scrap punched out in the punching work is caused to fall down to be discharged. Further, since vertical movement of the die is conducted according to the vertical movement of the piston rod of the fluid pressure cylinder, forming work can easily be performed on a workpiece.

In a punch press of the invention based upon a fourth aspect according to any one of the first aspect to the third aspect, a punch exchanging apparatus which can reciprocate between a punch accommodating section which accommodates the punch and the upper portion main shaft positioned at the punch exchanging height position is provided; and a die exchanging apparatus which can reciprocate between a die accommodating section which accommodates the die and the lower portion main shaft positioned at the die exchanging height position is provided.

With the above-described constitution, a delivery of the punch between the punch accommodating section and the upper portion main shaft is performed by moving the punch exchanging apparatus between the punch accommodating section and the upper portion main shaft, and a delivery of the die between the die accommodating section and the lower portion main shaft is performed by moving the die exchanging apparatus between the die accommodating section and the lower portion main shaft.

Therefore, a delivery of the punch and die set can be performed securely and rapidly.

In a punch press of the invention based upon a fifth aspect according to any one of the first aspect to the fourth aspect, the upper portion main shaft is provided with a pair of parallel punch engaging sections attachable/detachable from one direction to another direction or in the inverse direction; the lower portion main shaft is provided with a pair of parallel die engaging section attachable/detachable from one direction to another direction or in the inverse direction; the punch exchanging apparatus is provided with a first punch holding section which holds a punch supported by the upper portion main shaft at a time of movement thereof from the one direction to the another direction or in the inverse direction and a second punch holding section which supports the next punch to be attached to the upper portion main body; and the die exchanging apparatus is provided with a first die holding section which holds a die supported by the lower portion main shaft at a time of movement from the one direction to the another direction or in the inverse direction and a second die holding section which supports the next die to be attached to the lower portion main shaft.

With the above-described constitution, the punch is supported by the pair of parallel punch engaging section in the upper portion main shaft and is attached/detached by moving the punch from the one direction to the another direction or in the inverse direction. Further, the die is supported by the pair of parallel die engaging section in the lower portion main shaft and is attached/detached by moving the die from the one direction to the another direction or in the inverse direction.

Therefore, the punch and the die can easily be attached/detached by movement from the one direction to the another direction or movement in reverse direction.

Then, in the punch exchanging apparatus, the first punch holding section holds the punch supported to the upper portion main shaft and detaches the same from the upper portion main body, and attaches a punch to be used next which the second punch holding section holds to the upper portion main shaft by conducting the above-described movement from the one direction to the another direction or in the reverse direction. In the die exchanging apparatus, the first die holding section holds the die supported to the lower portion main shaft and detaches the same from the lower portion main shaft, and attaches a die to be used next which the second die holding section holds to the lower portion main shaft by conducting the above-described movement from the one direction to the another direction or in the reverse direction.

Therefore, a punch and die set exchanging time can be shortened largely.

In a punch press of the invention based on a sixth aspect according to any one of the first aspect to the fifth aspect, the punch exchanging apparatus is provided with a punch conveying member which can reciprocate between the punch accommodating section and the punch exchanging height position of the upper portion main shaft; a punch holding arm provided with first and second punch holding sections is provided so as to be capable of reciprocating in a direction crossing a movement direction of the punch conveying member; the die exchanging apparatus is provided with a die conveying section which can reciprocate between the die accommodating section and the die exchanging height position of the lower portion main shaft; and a die holding arm provided with first and second die holding sections is provided so as to be capable of reciprocate in a direction crossing a movement direction of the die conveying member.

With the above-described constitution, in the punch exchanging apparatus, attaching/detaching of the punch is performed by moving the punch holding arm which is provided on the punch conveying member moving between the punch accommodating section and the upper portion main shaft, while holding the punch, and is provided with the first and second punch holding sections in the direction crossing the movement direction of the punch conveying member. In the die exchanging apparatus, attaching/detaching of the die is performed by moving the die holding arm which is provided on the die conveying member moving between the die accommodating section and the lower portion main shaft while holding the die, and is provided with the first and second die holding sections in the direction crossing the movement direction of the die conveying member.

Therefore, in case that a detached punch is used again later, the punch is held in one punch holding section as it is, and after a new punch has been used, the punch being held can be re-attached by moving the punch holding arm in the inverse direction. Thereby, in case that two kinds of different dies AAA are continuously used as in a burring workpiece, a working efficiency can be improved largely.

In a punch press of the invention based upon a seventh aspect according to any one of the first aspect to the sixth aspect, the punch holding arm and the die holding arm are pivotably provided.

With the above constitution, the punch holding arm provided with the first and second punch holding portions and the die holding arm provided with the first and second die holding portions can be pivoted to change their directions.

Accordingly, the punch and die set exchanging apparatus can be provided between the punch and die set accommodating apparatus and the punch press.

A punch/die exchanging method for a punch press of the invention based upon an eighth aspect is a punch and die set attaching/detaching/exchanging method for a punch and die set attaching portion of a punch press, comprising the steps of: when a punch and die set exchanging claw is caused to approach to a punch and die set, which is retained so as to be attachable/detachable in one direction, in a direction crossing the one direction, holding a punch and die set held in the punch and die set attaching portion to a retaining member provided in the punch and die set attaching portion; moving the die exchanging claw to the one direction to released the held punch and die set; attaching a subsequent new punch and die set; and separating the punch and die set exchanging claw in the crossing direction.

With the above-described constitution, the punch and die set exchanging claw is caused to approach to the punch and die set attaching portion, while the punch and die set attached detachably in an approaching direction to the retaining member of the punch and die set attaching portion is held by the punch and die set exchanging claw to be detached and another die held by the punch and die set exchanging claw is attached; and thereafter, moving the punch and die set exchanging claw in a direction crossing the approaching direction linearly or in a pivoting manner.

Accordingly, since detaching of an old punch and die set and attaching of a new punch and die set can be performed one time, a punch and die set exchanging time can be shortened as compared with a conventional art.

In a punch/die exchanging method for a punch press of the invention based upon a ninth aspect according to the eighth aspect, comprises: unlocking the punch when the retaining member is ascended to a punch exchanging height position in a punch attaching portion constituting the punch and die set attaching portion; performing locking when the retaining member is descended to a punch exchanging height position; performing unlocking when the retaining member is descended to a die exchanging height position in a die attaching portion constituting the punch and die set attaching portion; and performing locking when the retaining member is ascended to a working height position.

With the above-described constitution, in the punch attaching portion constituting the punch and die set attaching portion, when the retaining member which holds a punch is ascended to the punch exchanging height position, the punch is unlocked detachably, or when the retaining member holding the punch is descended to the working height position, the punch is locked and when the retaining member which holds the die in the die attaching portion is descended to the die exchanging height position, the die is unlocked or when the retaining member holding the die is ascended to the working height position, locking is performed.

Accordingly, locking and unlocking times of the punch/the die can be shortened.

A punch/die exchanging method for a punch press of the invention based upon a tenth aspect is a punch and die set attaching/detaching/exchanging method for a punch and die set attaching portion of a punch press, comprising the steps of: when a punch and die set exchanging apparatus is moved in one direction to the punch and die set attaching portion, holding a die supported by the punch and die set attaching portion with the punch and die set exchanging apparatus to detach the punch and die set from the punch and die set attaching portion and sequentially attaching a new punch and die set prepared and held by the punch and die set exchanging apparatus to the punch and die set attaching portion.

With the above-described constitution, by moving the punch and die set exchanging apparatus in only one direction to the punch and die set attaching portion attached with a punch and die set, a punch and die set attached is detached and a new punch and die set prepared and held by the punch and die set exchanging apparatus is attached to the punch and die set attaching portion.

Accordingly, the punch and die set exchanging time can be shortened as compared with the conventional art.

A punch/die exchanging method for a punch press of the invention based upon an eleventh aspect is a die attaching/detaching/exchanging method for a punch and die set attaching portion in a punch press, comprising the steps of: when a punch and die set exchanging claw is moved in one direction to approach to a punch and die set retained to a retaining member provided in the punch and die set attaching portion attachably/detachably in the one direction, continuing to hold the punch and die set held in the punch and die set attaching portion and attaching a next punch and die set to be exchanged to the punch and die set attaching portion; and after the punch and die set exchanging claw is moved in a direction crossing the one direction, moving the punch and die set exchanging claw in a direction separating from the punch and die set attaching portion to perform punch and die set exchanging.

With the above-described constitution, after an attached punch and die set is detached by moving a punch and die set exchanging apparatus in one direction to the punch and die set attaching portion attached with the punch and die set and a new punch and die set prepared and held by the die exchanging apparatus is attached to the punch and die set attaching portion, the punch and die set exchanging apparatus is moved in a direction crossing the one direction to perform punch and die set exchanging.

Accordingly a punch and die set exchanging time can be shortened as compared with the conventional art.

In order to achieve the above-described second object, a punch system of this invention based upon a twelfth aspect comprises: a punch press which performs punching work on a plate-shaped workpiece; a rack provided with a punch and die set accommodating portion which accommodates therein many dies and punches to be applied for attaching/detaching/exchanging to the punch press so as to allow taking-out/taking-in thereof; a punch and die set taking-out/taking-in apparatus which performs taking-out/taking-in of a punch/a die to the punch and die set accommodating portion of the rack; and a punch and die set exchanging apparatus which can deliver a punch/a die to the punch and die set taking-out/taking-in apparatus and can receive a punch/a die therefrom and which can reciprocate between a punch and die set delivery position to the punch and die set taking-out/taking-in apparatus and the punch press; wherein a punch taking-out/taking-in arm for performing taking-out/taking-in of a punch and a die taking-out/taking-in arm for performing taking-out/taking-in of a die are provided pivotably forward and backward in the punch and die set taking-out/taking-in apparatus; and a punch holding arm which holds a punch and a die holding arm which holds a die are provided pivotably forward and backward in the punch and die set exchanging apparatus.

With the above-described constitution, by pivoting the punch taking-out/taking-in arm for performing taking-out/taking-in of a punch and the die taking-out/taking-in arm for performing taking-out/taking-in of a die of the punch and die set taking-out/taking-in apparatus in front and back directions and pivoting the punch holding arm holding a punch and the die holding arm holding a die of the punch and die set exchanging apparatus forward and backward, taking-out/taking-in of many punches and dies accommodated in the punch and die set accommodating portion of the rack and delivery of a die are preformed between the punch and die set taking-out/taking-in apparatus positioned at the die delivery position and the punch and die set exchanging apparatus reciprocating between the punch and die set delivery position and the punch and die set exchanging position.

Accordingly, even in a small space, a punch and die set can be taken out to be delivered to the punch and die set exchanging apparatus. Further, since the punch and die set taking-out/taking-in apparatus can prepare a next punch and die set and maintains standby state while the punch and die set exchanging apparatus has been moved to the punch and die set exchanging position, shortening of a punch and die set exchanging time can be achieved.

In a punch system of this invention based upon a thirteenth aspect according to the twelfth aspect, the punch press comprises a gate-shaped frame and is provided at a center portion with a punching work portion; a workpiece moving and positioning apparatus for moving a workpiece in X-axis and Y-axis directions to position the same with respect to the punching work portion is provided on one side of the punching work portion; the rack is disposed on an opposite side of the workpiece moving and positioning apparatus through the punching work portion; and the punch and die set exchanging apparatus is disposed inside the frame of the punch press between the punching work portion and the rack.

With the above-described constitution, the workpiece moving and positioning apparatus which positions a workpiece on one side of the punching work portion is provided to the punching work portion provided at a center portion of the gate-shaped frame of the punch press, and the rack which accommodates punches and dies is disposed on a opposite side of the punching work portion, and the punch and die set exchanging apparatus moves inside the frame between the punching work portion and the rack.

Accordingly, compactness of the punch and die set exchanging apparatus can be achieved.

In a punch system of the invention based upon a fourteenth aspect according to the twelfth or the thirteenth aspect, forward or rearward pivot of the punch holding arm and the die holding arm in the punch and die set exchanging apparatus is performed when the punch and die set exchanging apparatus is being moving forward or rearward.

With the above-described constitution, the punch holding arm and the die holding arm in the punch and die set exchanging apparatus are pivoted forward or backward during the forward or rearward movement of the punch and die set exchanging apparatus.

Accordingly, the punch holding arm and the die holding arm in the punch and die set exchanging apparatus does not require a time for pivoting. For this reason, a time required for punch and die set exchanging can be shortened.

In a punch system of the invention based upon a fifteenth aspect according to any one of the twelfth to the fourteenth aspects, the racks are disposed through the punch and die set taking-out/taking-in apparatus at a front side thereof and at a rear side thereof so as to be opposed to each other; and a punch and die set delivery position between the punch and die set taking-out/taking-in apparatus and the punch and die set exchanging apparatus is a position standing abreast of the rack at the front side.

With the above-described constitution, the punch and die set taking-out/taking-in apparatus moves between the racks disposed so as to be opposed to each other, and delivery of a die between the punch and die set taking-out/taking-in apparatus and the punch and die set exchanging apparatus is performed at the die delivery position provided at a position standing abreast of the rack at the front side.

Accordingly, saving of a space for the punch and die set accommodating apparatus can be achieved.

BEST MODE FOR CARRYING OUT THE INVENTION

Embodiments of this invention will be explained in detail below with reference to the drawings.

Figure 1:
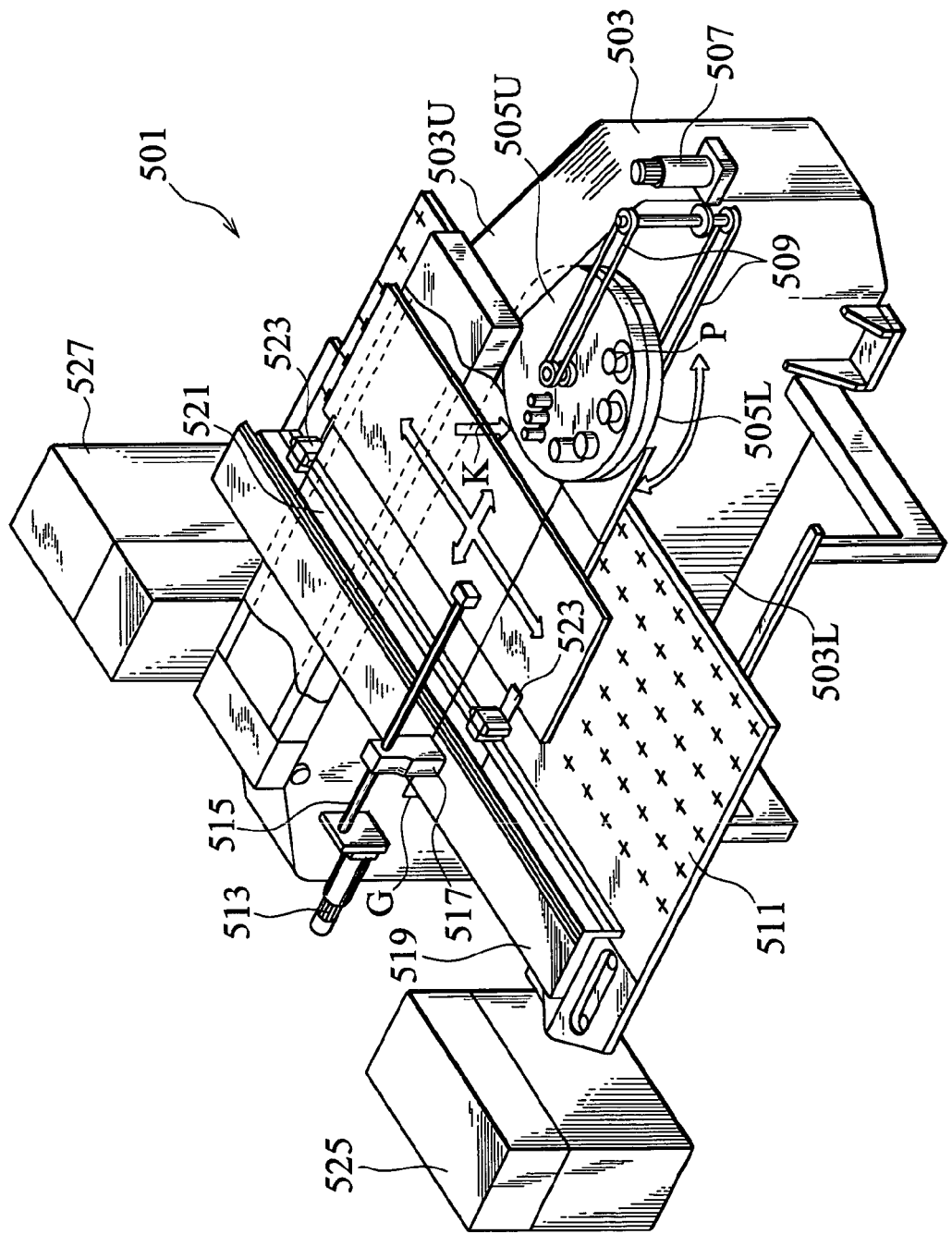
FIG. 1 is a perspective view showing an ordinary conventional turret punch press.
Figure 2:
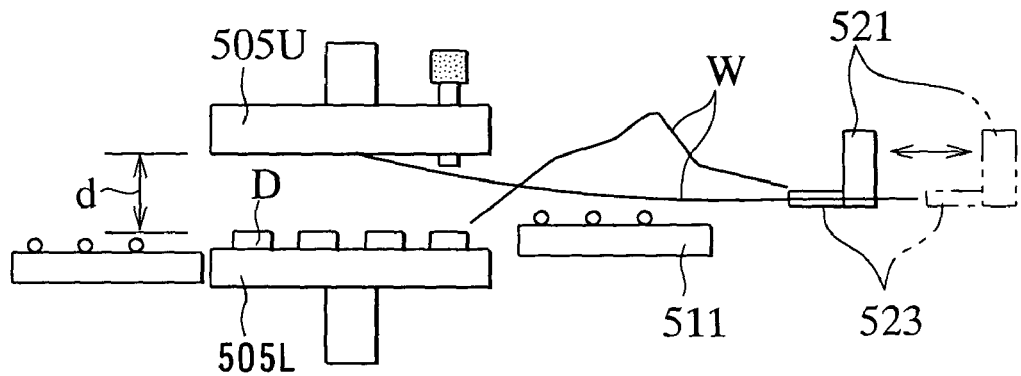
FIG. 2 is an explanatory diagram showing a problem in the conventional turret punch press.
Figure 3:
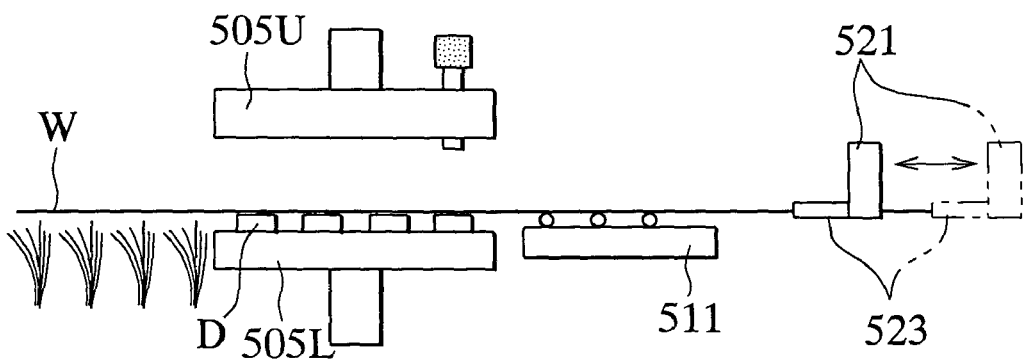
FIG. 3 is an explanatory diagram showing another problem in the conventional turret punch press.
Figure 4:
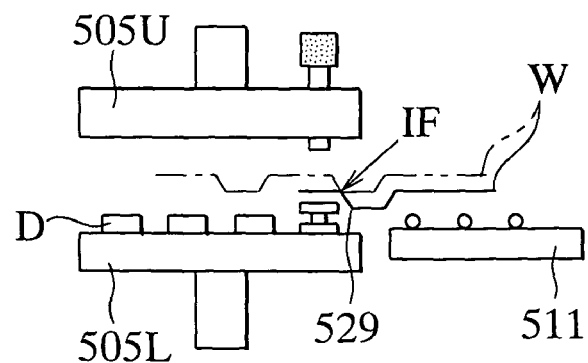
FIG. 4 is an explanatory diagram showing another problem in the conventional turret punch press.
Figure 5:
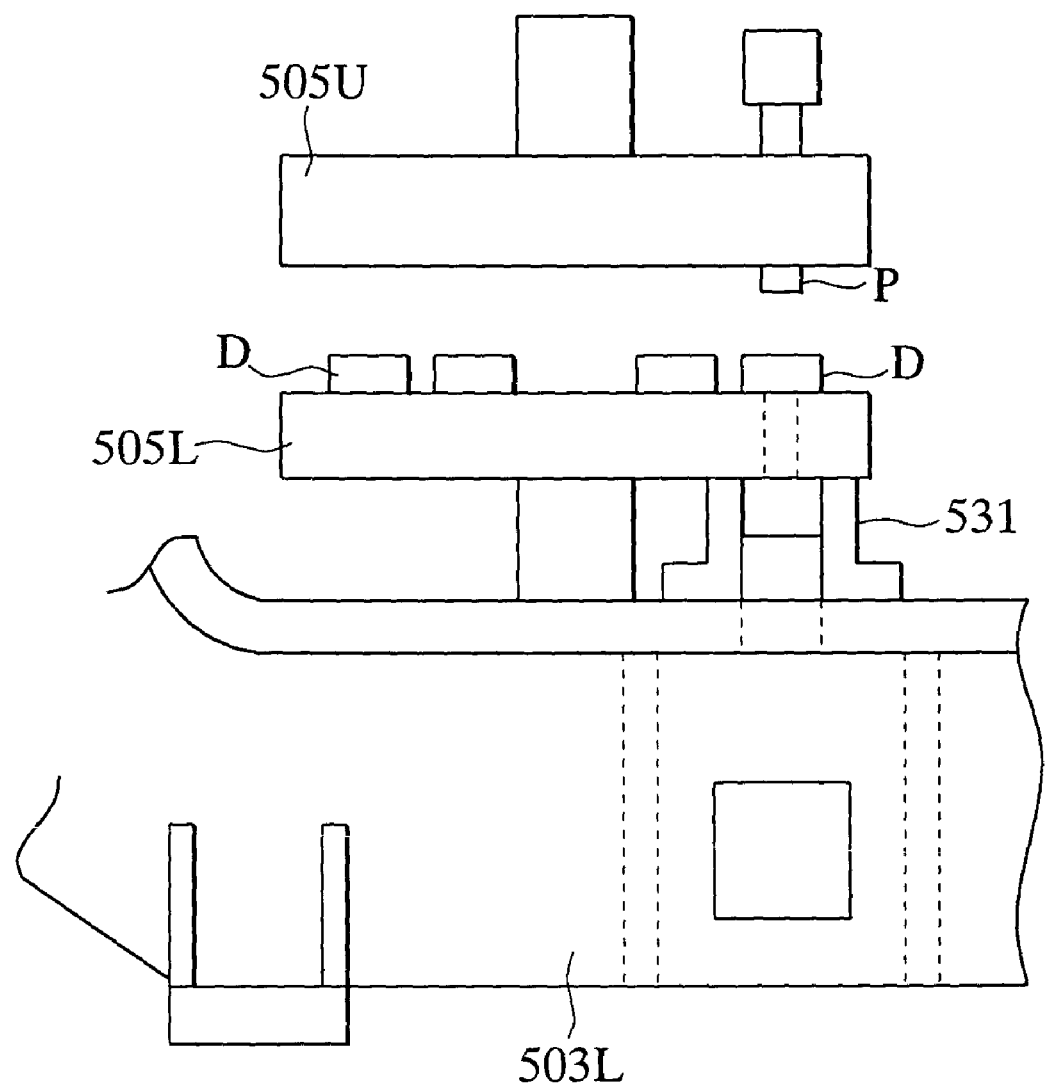
FIG. 5 is an explanatory diagram showing another problem in the conventional turret punch press.
Figure 6:
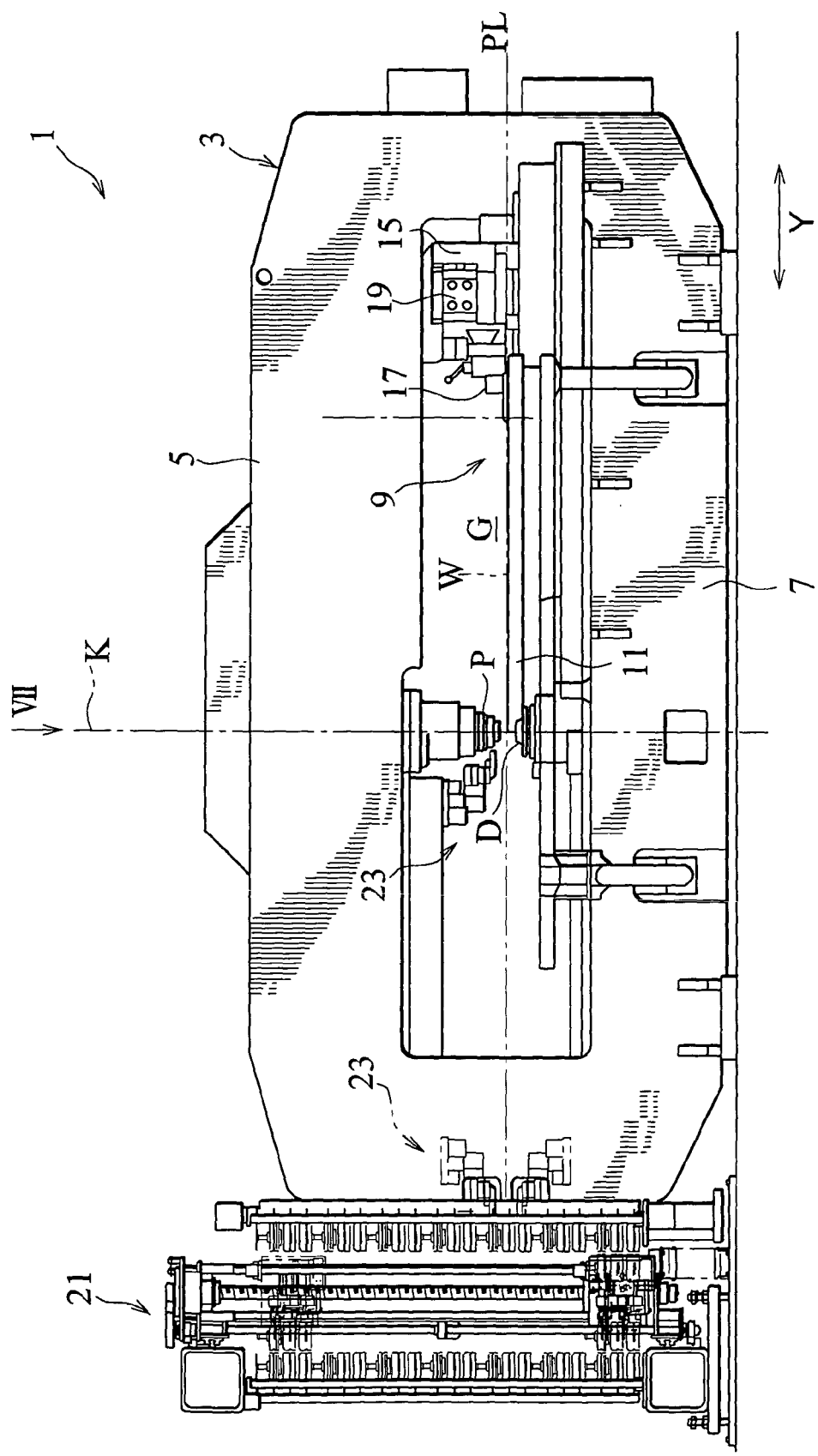
FIG. 6 is a front view showing the entire of a punch press according to the present invention.
Figure 7:
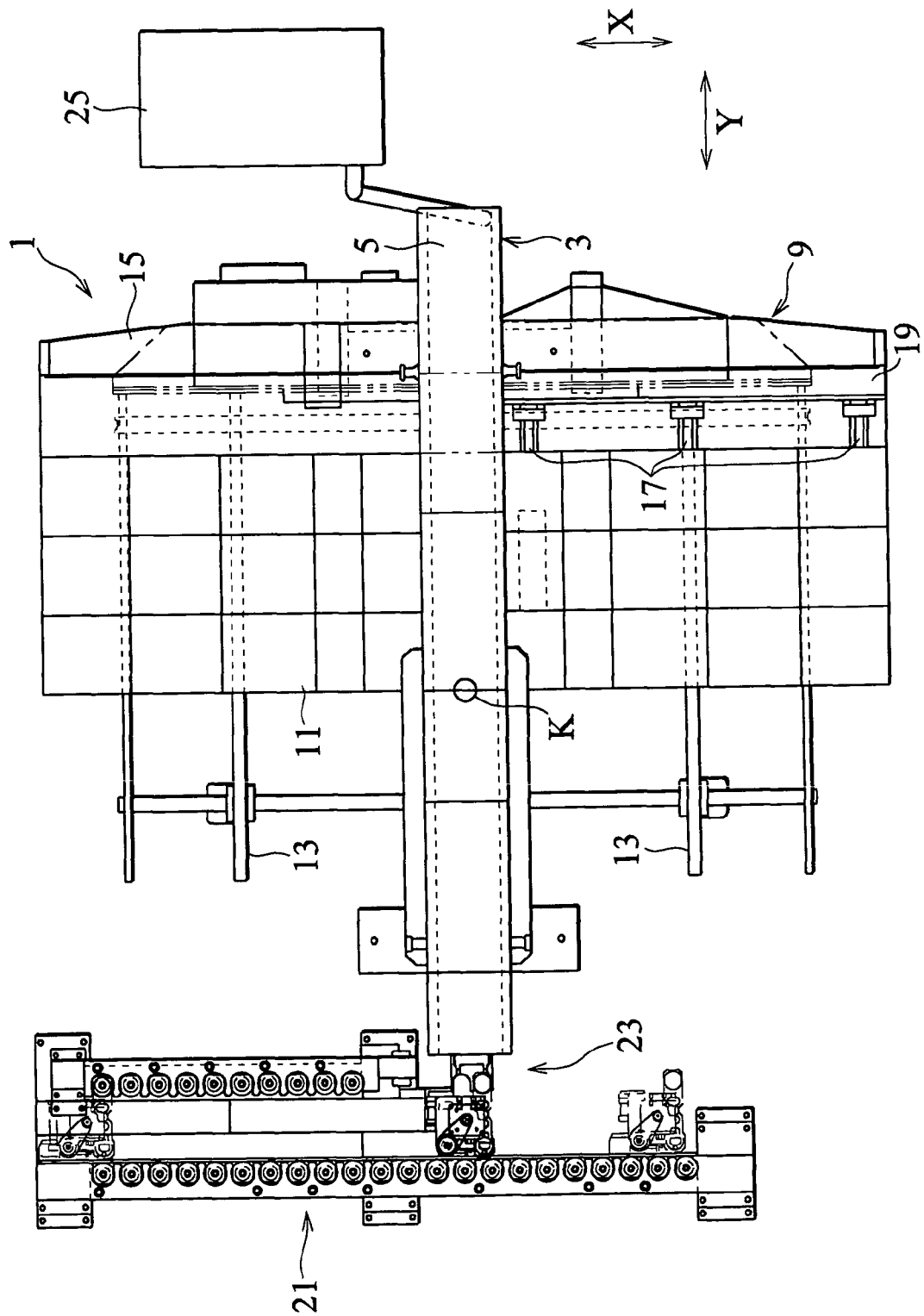
FIG. 7 is a plan view seen from direction VII in FIG. 6.

In FIG. 6 and FIG. 7, a punch press 1 according to this invention is shown. In the punch press 1, a gap G is provided between an upper portion frame 5 and a lower portion frame 7 at a center portion of a frame 3 formed in a gate shape. A punch P is supported at a working position K in the gap G by the upper portion frame 5 so as to be movable vertically, and a die D is supported by the lower portion frame 7 so as to be movable vertically.

On the other hand, a workpiece moving and positioning apparatus 9 which supports and positions a workpiece W to be worked is provided in the gap G. In the workpiece moving and positioning apparatus 9, a carriage base 15 is provided at a right end portion of a working table 11 in FIG. 6 such that the workpiece table 11 can be moved along a pair of guide rails 13 provided in an Y-axis direction (right and left directions in FIG. 6), and the carriage base 15 can be moved/positioned in the Y-axis direction by a Y-axis motor (not shown). Further, the carriage base 15 is provided with an X carriage 19 which has a plurality of workpiece clampers 17 grasping a workpiece W and can be moved/positioned in an X-axis direction (a vertical direction in FIG. 7).

With the above-described constitution, a workpiece W grasped by the workpiece clampers 17 is positioned at the working position K by moving the X carriage 19 in the X-axis direction or moving the carriage base 15 in the Y-axis direction. Then, the punch P is punching-actuated by a driving apparatus so that punching work is performed on the workpiece W with cooperation of the punch P and the die D.

On the other hand, a punch and die set accommodating apparatus 21 which accommodates many punches P and dies D is provided at a left side of the punch press 1 in FIG. 6. A punch and die set exchanging apparatus 23 for conveying a used die from the punch press 1 to accommodate the same in the punch and die set accommodating apparatus 21 and for conveying a new punch and die set to be used next into the punch press 1 is provided between the punch and die set accommodating apparatus 21 and the punch press 1. Furthermore, a hydraulic unit 25 for controlling a hydraulic cylinder or the like is provided at a right side of the punch press 1.

Figure 8:
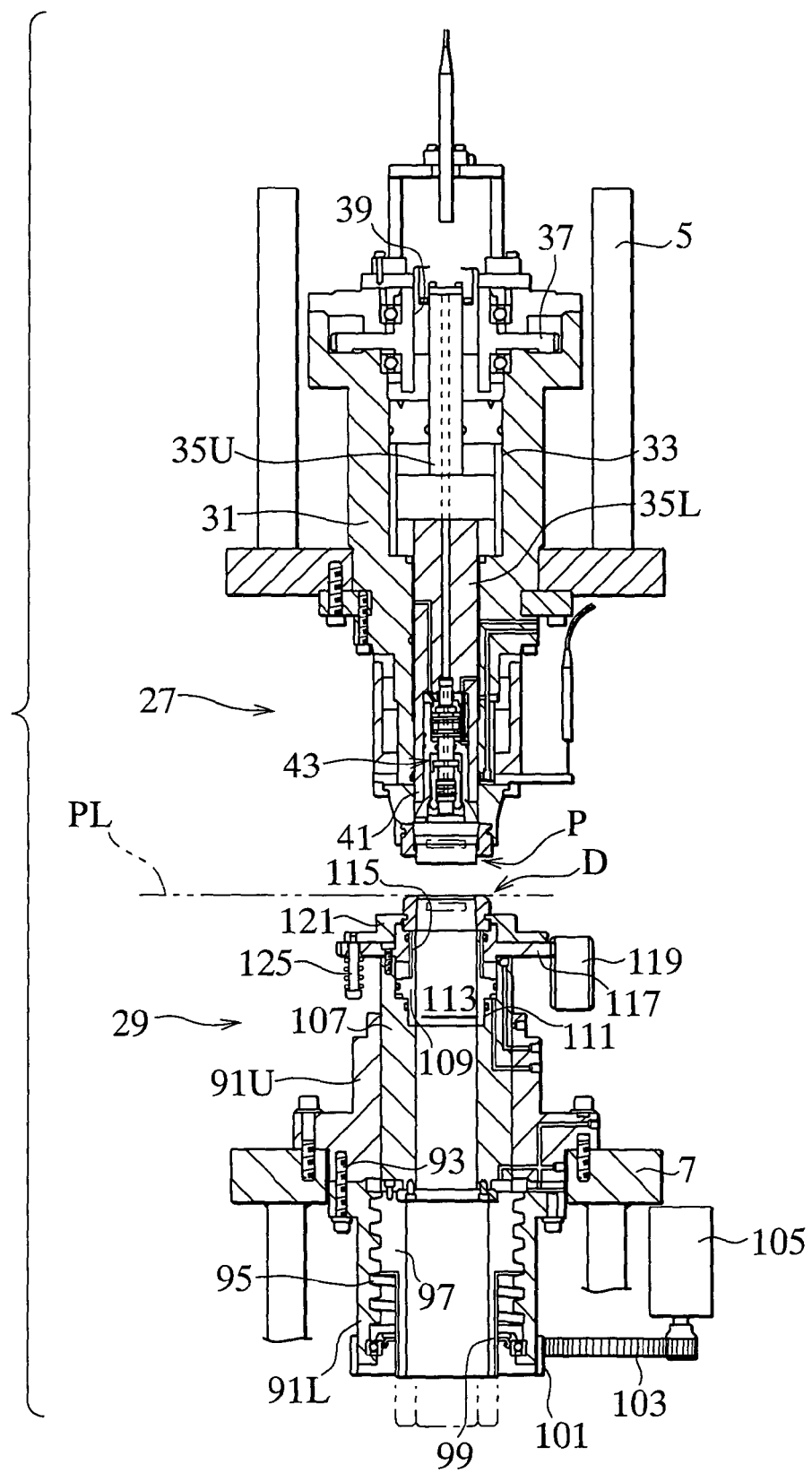
FIG. 8 is a sectional view showing a punch supporting portion and a die supporting portion.
Figure 9:
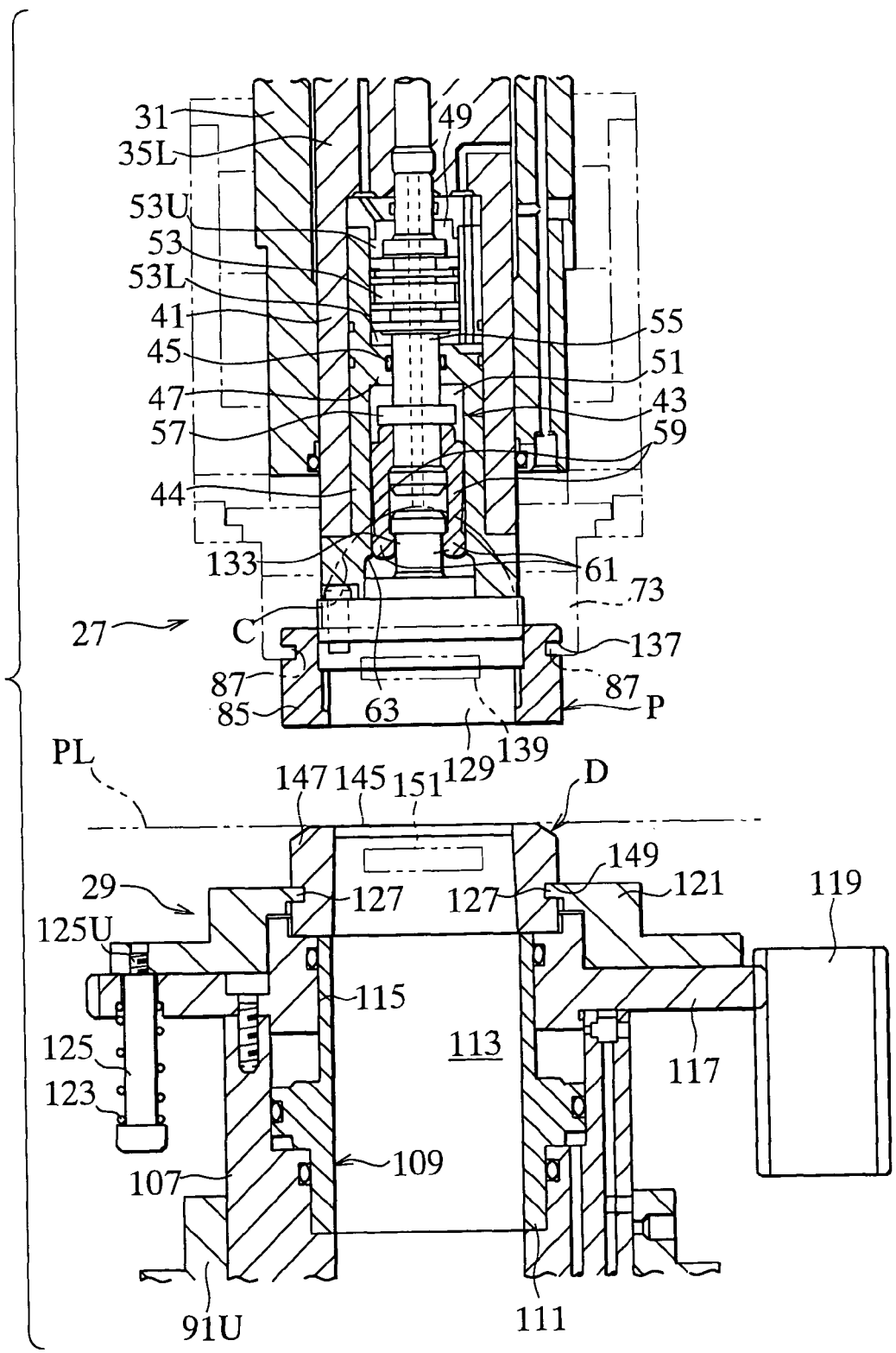
FIG. 9 is a sectional view showing the punch supporting portion and the die supporting portion at a time of working.
Figure 10:
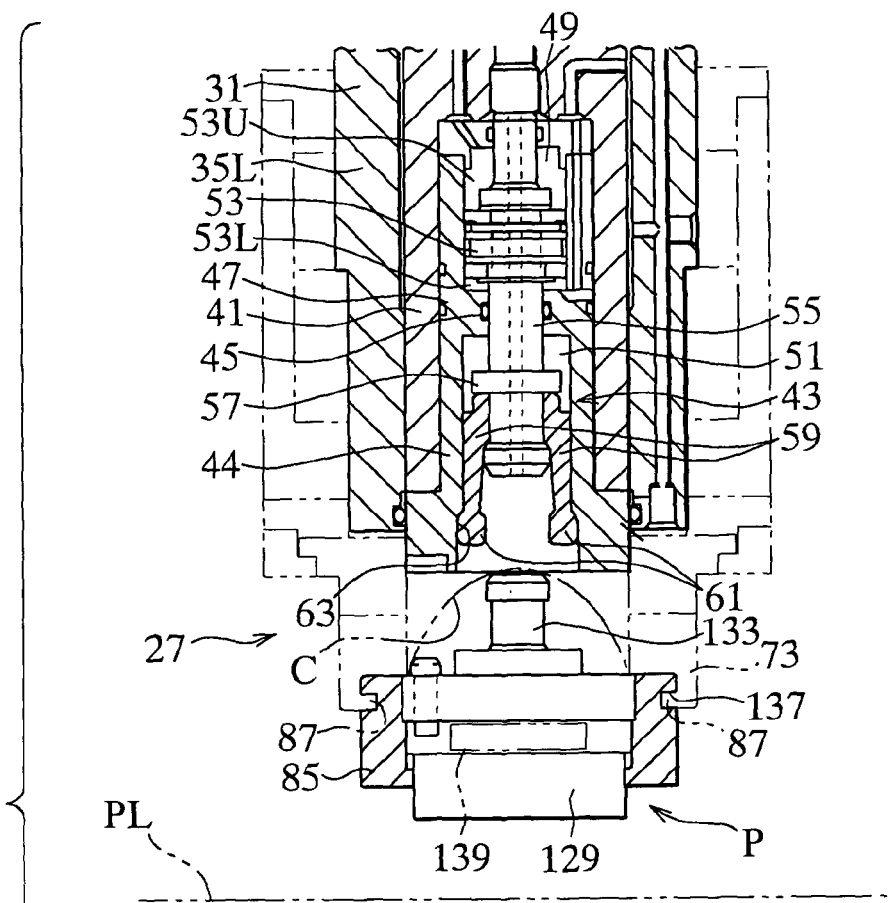
FIG. 10 is a sectional view showing the punch supporting portion and the die supporting portion at a time of punch and die set exchanging.
Figure 10:
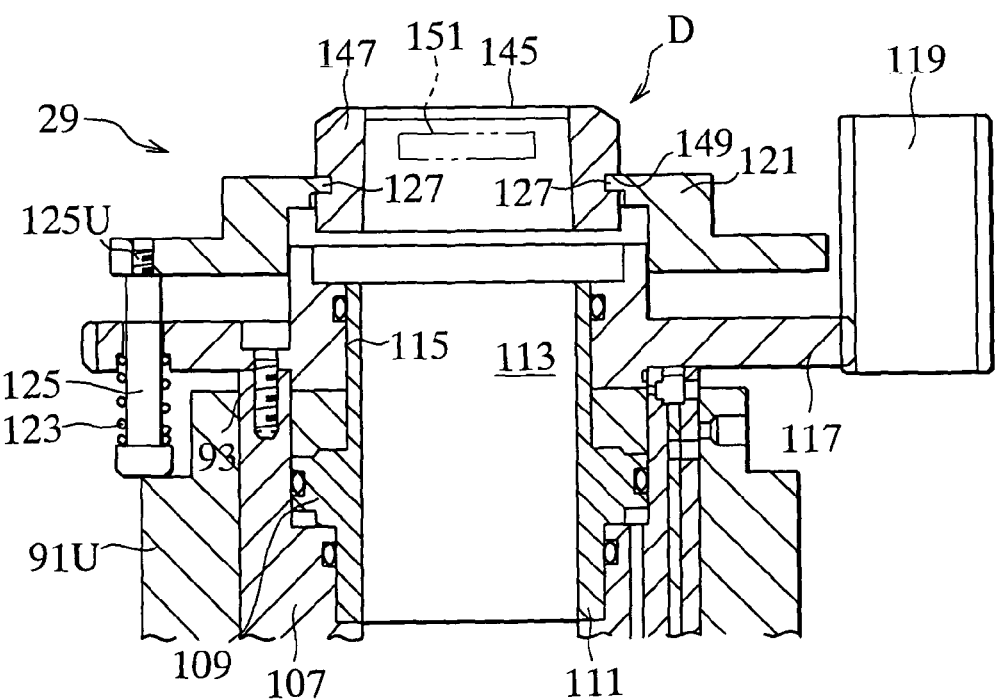

In FIG. 8 to FIG. 10, a punch supporting portion 27 which supports a punch P and a die supporting portion 29 which supports a die D are shown.

Referring to FIG. 8, a cylindrical supporting body 31 with a step portion in the punch supporting portion 27 is fixed to the upper portion frame 5, a ram cylinder 33 is provided in a center portion space in the supporting body 31, and an indexing gear 37 is attached and mounted to an upper end portion of an upper piston rod 35U extending upwardly.

The indexing gear 37 is coupled to the upper piston rod 35U by a spline portion 39 so as to be rotated integrally therewith and be relatively movable vertically, and it is rotationally driven by a indexing motor (not shown) through a gear (not shown) to rotate the punch P.

Referring to FIG. 9 and FIG. 10 in combination, a press ram portion 41 serving as an upper portion main shaft is provided at a lower end portion of a lower piston rod 35L extending downwardly from the ram cylinder 33, so that positioning at working height position and a punch and die set exchanging height position can be made possible according to action of the ram cylinder 33. A lock mechanism 43 serving as a punch damper for grasping the punch P to lock the same is provided inside of the press ram portion 41.

The lock mechanism 43 has a lock outer cylinder 44, the lock outer cylinder 44 is provided inside of the press ram portion 41, an inner space of the lock outer cylinder 44 is partitioned to an upper portion space 49 and a lower portion space 51 by a partition 47 with a seal 45, and a lock cylinder 53 is provided in the upper portion space 49. A piston rod 55 of the lock cylinder 53 extends into the lower portion space 51 through the partition 47, and a plate 57 and a plurality of lock claws 59 (collet chuck) openable/closable are provided at a lower end portion of the piston rod 55 in the lower portion space 51. A spherical portion 61 is provided at a distal end portion of the lock claw 59, and a step portion 63 is provided at a lower portion inner side of the lock outer cylinder 44 such that the lower portion space 51 in which the lock claws 59 moves vertically becomes broad at its lower end portion.

Accordingly, when pressure oil is supplied to an upper chamber 53U of the lock cylinder 53 to descend the lock claws 59, the spherical portions 61 of the lock claws 59 are moved downward below the step portion 63 so that the lock claws 59 is opened and put in an unlock state (a state shown in FIG. 10). On the other hand, when the pressure oil is supplied to a lower chamber 53L of the lock cylinder 53 to ascend the lock claws 59, the spherical portions 61 of the lock claws 59 are ascended and moved inwardly by the step portion 63, so that the lock claws 59 are closed and put in a lock state (a state shown in FIG. 9).

Figure 11:
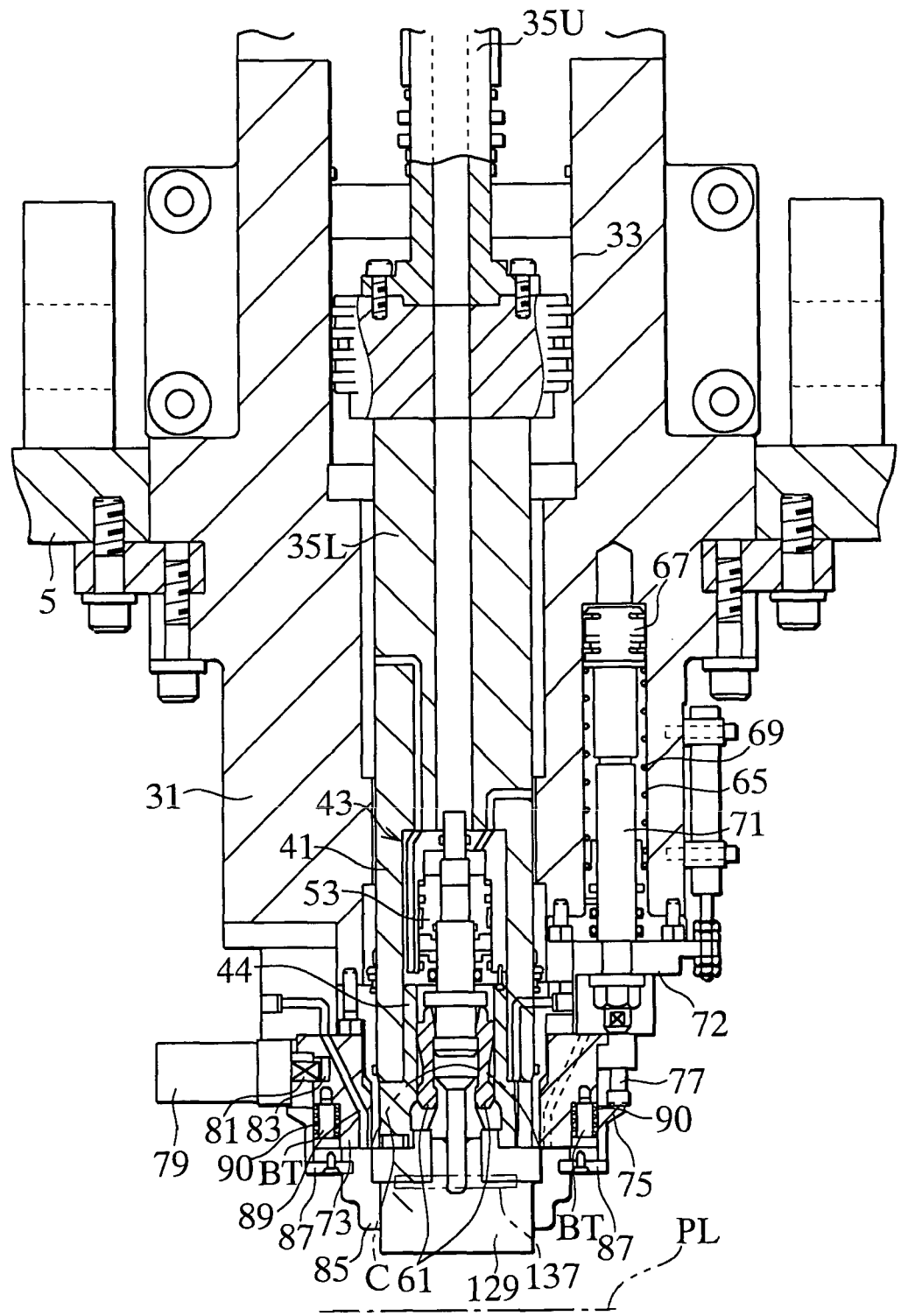
FIG. 11 is a sectional view showing the punch supporting portion and a plate presser.

Referring to FIG. 11, cylinders 65 for plate presser vertical movement serving as a fluid pressure cylinder are provided at four positions on a lower end portion of the supporting body 31, a piston 67 of the cylinder 65 for plate presser vertical movement is urged upward by a spring 69, and a pressing force can be adjusted by the cylinder 65 for plate presser vertical movement according to a plate thickness of a workpiece W.

Further, an upper plate presser supporting block 72 of a plate presser supporting member is mounted to a lower end portion of the piston rod 71 so as to be movable vertically, a lower plate presser supporting block 73 is further mounted to a lower portion of the upper plate presser supporting block 72 so as to be movable vertically and rotatable, and a retaining member 75 is provided at an outside lower end of the lower plate presser supporting block 73. The retaining member 75 is caused to abut on a stopper 77 provided at a lower end portion of the upper plate presser supporting block 72.

Furthermore, an air cylinder 79 is mounted to the lower plate presser supporting block 73 so as to direct inwardly, and a distal end of the piston rod 81 is fitted into a recess portion 83 of the lower plate presser supporting block 73 so that rotation of the lower plate presser supporting block 73 is stopped at a predetermined position.

A pair of punch holding claws 87 serving as left and right (left and right in FIG. 9 and FIG. 10) retaining members are provided at the plate presser supporting block 73 for holding a plate presser 85 serving as a die attaching portion of a punch P through the retaining member 75.

Moreover, oil passages 89 for lubricating oil supply are provided in the plate presser supporting block 73. Bolts BT are provided interior of the retaining member 75, and the retaining member 75 is always urged upwardly by biasing force of a spring 90 provided for each bolt BT. Therefore, adjustment is performing by adjusting the height of the stopper 77 in order to set a slight clearance between an upper face of a plate presser 87 and a lower face of the lower plate presser supporting block 73.

Notches C for avoiding interference with a pull stud 133 of a punch P described later at an exchanging time of punches P are provided at front and rear portions in FIG. 11 at a lower portion of the lock outer cylinder 44, as shown with a double dotted line.

On the other hand, referring to FIG. 8, upper and lower supporting bodies 91U, 91L formed in a cylindrical shape are joined together by bolts 93 in the die supporting portion 29, and they are fixed to the lower portion frame 7.

A screw portion 95 is formed in an inner peripheral face of the lower supporting body 91L, and an ascending and descending member 97 which is screwed to the screw portion 95 so as to be movable vertically relative to the lower supporting body 91L is provided. An ascending and descending gear 101 is provided to a lower end portion of the ascending and descending member 97 via a spline portion 99 so as to be movable vertically relative to the ascending and descending member 97 and be rotated integrally therewith, and the ascending and descending gear 101 is rotated at a fixed position. The ascending and descending gear 101 is rotated by an ascending and descending motor 105 via a gear 103 and the like.

Accordingly, when the ascending and descending motor 105 rotates the ascending and descending gear 101 vie the gear 103 and the like, the ascending and descending member 97 is moved vertically along the lower supporting body 91L according to action of the screw portion 95, so that the ascending and descending member 97 is positioned at a working height position (a state shown in FIG. 9) where an upper face of a die D at a working time is positioned at a path line or at an exchanging height position (a state shown in FIG. 10) for exchanging dies D.

Referring to FIG. 9 and FIG. 10 in combination, a supporting stand 107 serving as a lower portion main shaft movable vertically along an inner peripheral face of the upper supporting body 91U is provided on an upper side of the ascending and descending member 97, and a working height position and a punch and die set exchanging height position can selectively be positioned. A forming cylinder 109 serving as a fluid pressure cylinder is provided on an upper end portion of the supporting stand 107. A hollow space 113 is provided in a center portion of a piston rod member 111 of the forming cylinder 109 so as to extend vertically, which allows falling-off and discharging of a punched-out scrap occurring at a punching time.

An indexing gear 117 is provided on an upper portion and outer peripheral face of the piston rod member 111 via a spline portion 115 so as to be movable vertically relative to the piston rod member 111 and be rotatable integrally therewith, and the gear 117 is rotated at a fixed position by an indexing motor 119.

Further, a die supporting block 121 serving as a punch and die set attaching portion is provided on an upper side of the indexing gear 117. And the die supporting block 121, penetrating the indexing gear 117, is always urged downwardly by a spring 123. However, it is rotated integrally with the indexing gear 117 as a screw portion 125U at an upper end of the pin is screwed into the die supporting block (refer to FIG. 9).

Incidentally, as shown in FIG. 10, when the supporting stand 107 is descended, the indexing gear 117 is also descended integrally therewith so that the pin 125 is also descended. However, since a lower end portion of the pin 125 abuts on an upper end portion of the upper supporting body 91U so that it is prevented from further descending, the pin 125 is pushed up relatively. The die supporting block 121 is relatively pushed up by the pin 125, an lower face of a die holder 147 is separated from au upper end face of the piston rod member 111 so that an unlock state is achieved.

A pair of die holding claws 127 serving as left and right (left and right in FIG. 9 and FIG. 10) retaining members for holding a die D are provided on the die supporting block 121.

Accordingly, in the unlock state where the supporting stand 107 has been descended, since the indexing gear 117 is rotated by the indexing motor 119 so that the die holding claws 127 are also rotated integrally, rotational indexing of the die D held by the die holding claws 127 can be performed. Then, the supporting stand 107 is ascended to push an upper end face of the supporting stand 107 onto a lower face of the die holder 147, thereby achieving a lock state (refer to FIG. 9).

Next, the punch P and the die D will be explained.

Figure 12A:
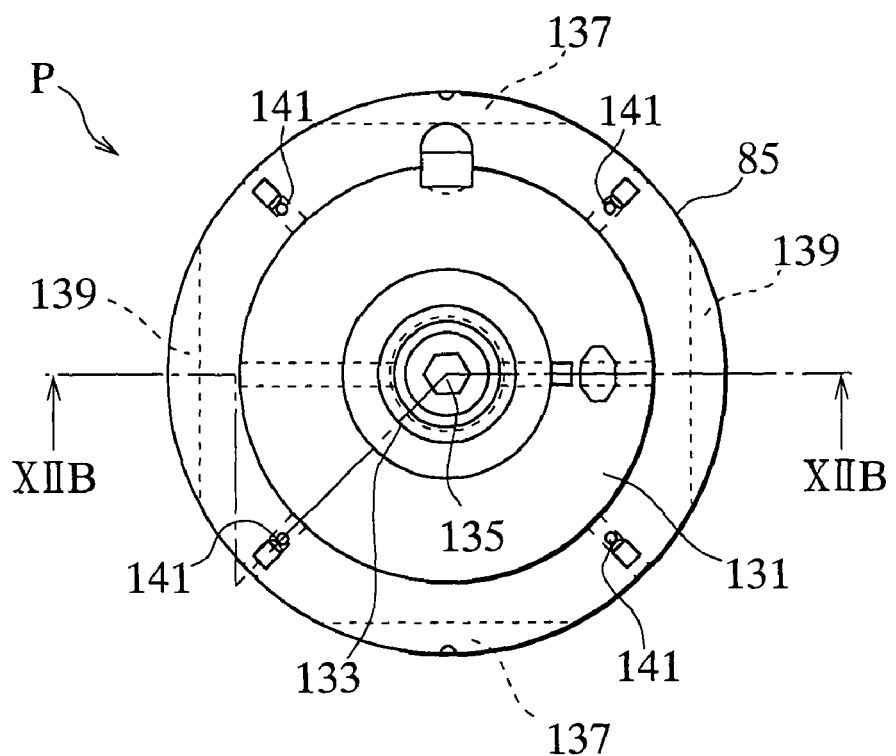
FIG. 12A to FIG. 12B are a plan view and a sectional view of a punch.
Figure 12B:
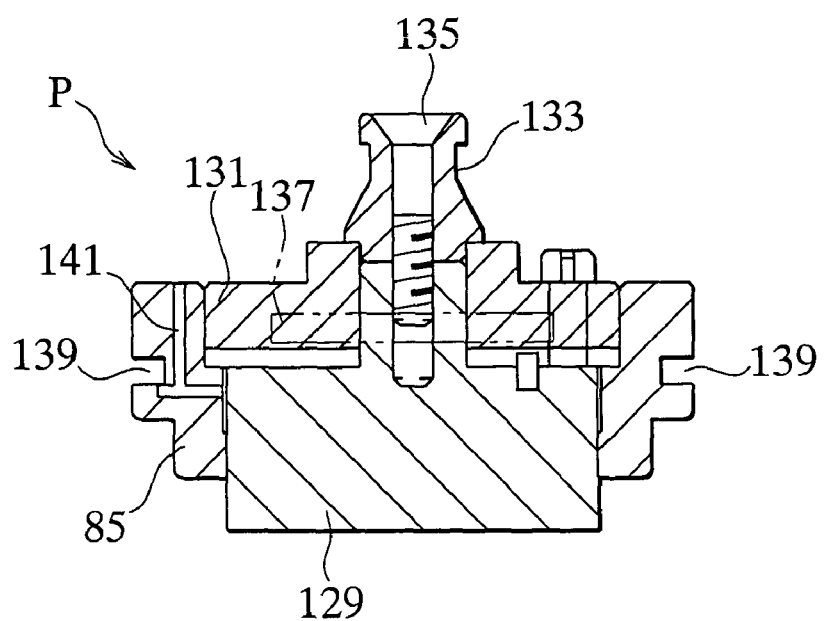

Referring to FIG. 12A and FIG. 12B in combination, a plate presser 85 is provided around a punch blade portion 129 so as to be relatively movable vertically in the punch P, and the punch blade portion 129 can be descended until a punch upper portion 131 mounted on an upper side of the punch blade portion 129 is caught by a recess portion of the plate presser 85. A pull stud 133 locked by the above-described lock mechanism 43 is mounted upwardly on an upper face of the punch blade portion 129 by a bolt 135, and the punch upper portion 131 is integrally mounted on the punch blade portion 129 via the pull stud 133.

Further, a pair of parallel punch attaching grooves 137 serving as a punch retaining portion to be held by the workpiece supporting claws 87 of the plate presser supporting block 73 on an upper side (an upper side in FIG. 12B) are provided on an outer peripheral face of the plate presser 85, and a pair of parallel punch exchanging grooves 139 to be applied for holding at a punch exchanging time are provided on a lower side of the punch attaching grooves 137 so as to extend in a direction crossing the punch attaching grooves 137 (here, a direction perpendicular to the grooves 137; left and right directions in FIG. 12A).

For this reason, by moving the punch P along the punch attaching grooves 137, a punch can easily be detached and another punch can easily be attached, so that a punch exchanging time can largely be shortened. Incidentally, lubricating oil supplying passages 141 for supplying lubricating oil to a sliding face between the plate presser 85 and the punch blade portion 129 are provided at four positions in the interior of the plate presser 85.

Figure 13A:
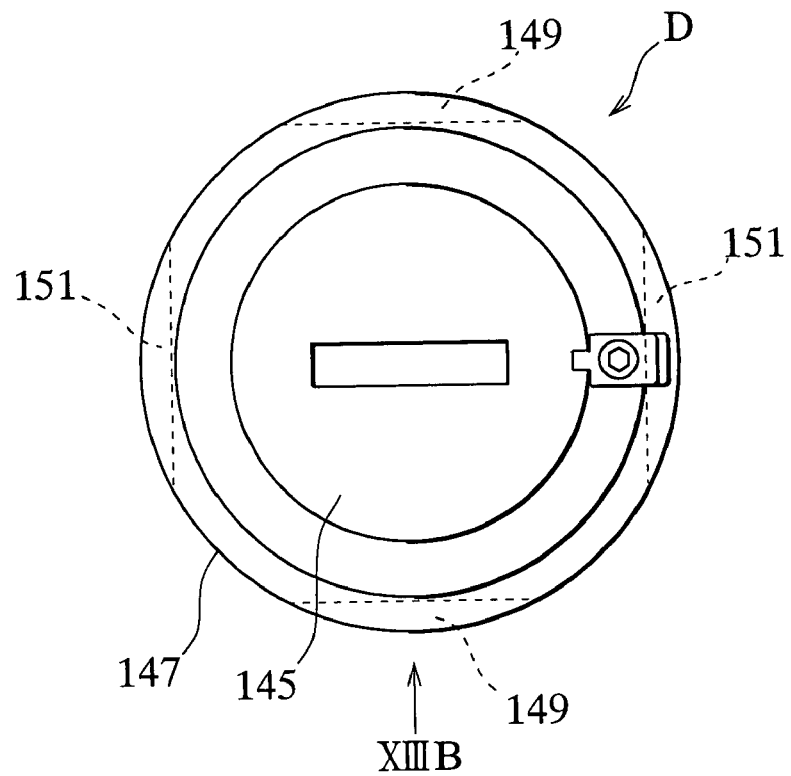
FIG. 13A to FIG. 13B are a plan view and a sectional view of a die.
Figure 13B:
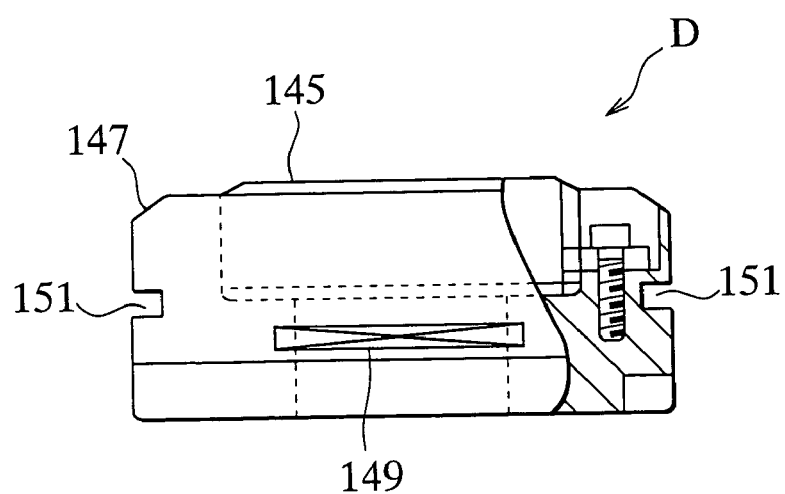

Referring to FIG. 13A and FIG. 13B, a die blade portion 145 is supported to a die holder 147 in the die D. A pair of parallel die attaching grooves 149 serving as a die retaining portion to be grasped by the die holding claws 127 of the die supporting block 121 on a lower side (on a lower side in FIG. 13B) are provided on an outer peripheral face of the die holder 147, and a pair of parallel die exchanging grooves 151 to be applied for holding at a die exchanging time are provided on an upper side of the die attaching grooves 149 so as to extend in a direction crossing the die attaching grooves 149 (here, a direction perpendicular to the grooves 149; a vertical direction in FIG. 13A).

For this reason, by moving the die D along the die attaching grooves 149, a die can easily be detached and another die can easily be attached, so that a die exchanging time can largely be shortened.

Figure 14:
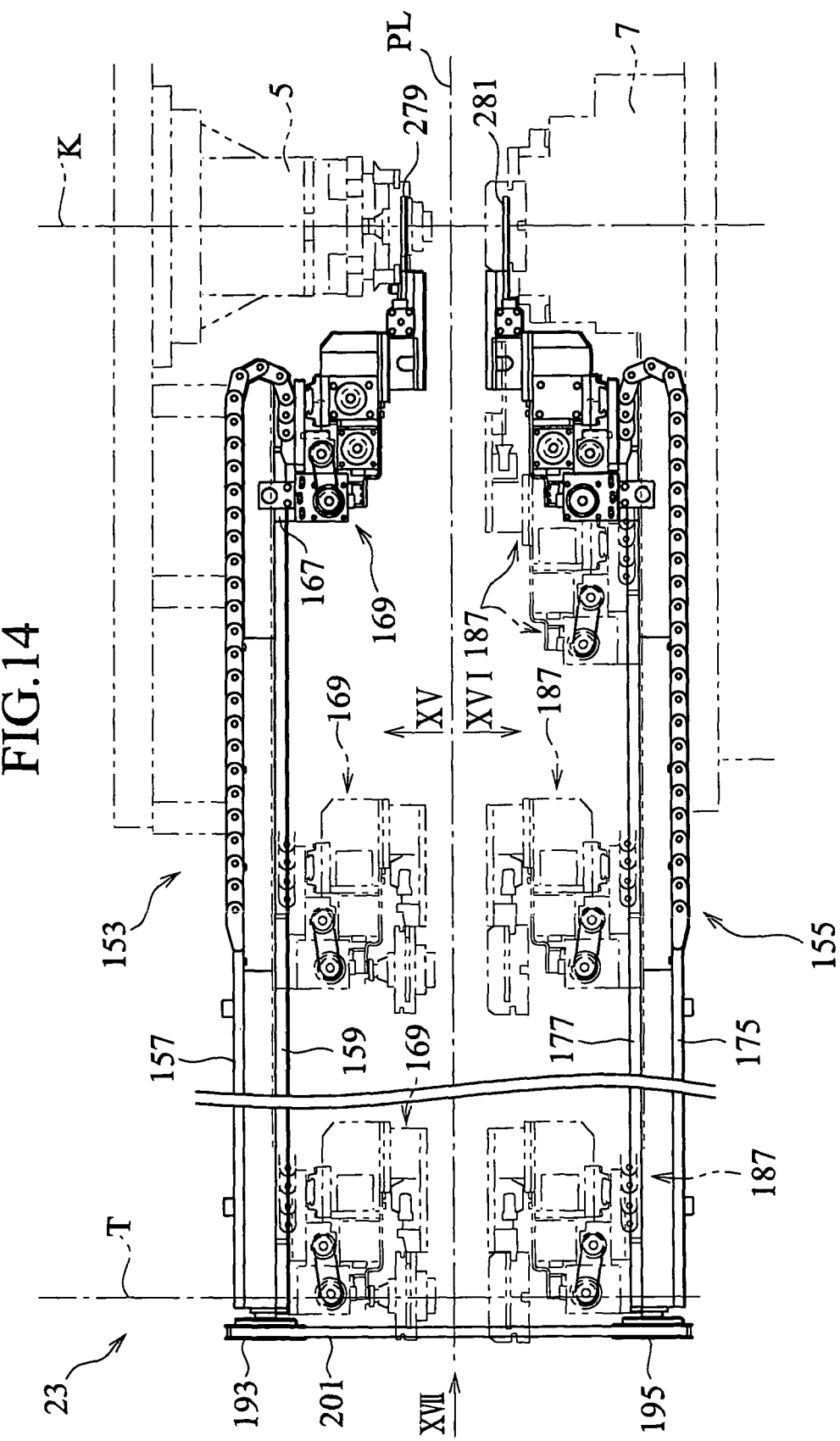
FIG. 14 is a front view of a punch and die set exchanging apparatus.

Next, the punch and die set exchanging apparatus 23 will be explained. Referring to FIG. 14, a punch exchanging apparatus 153 for punch exchange is proved on an upper side and a die exchanging apparatus 155 for die exchange is provided in parallel to the punch exchanging apparatus 153 on a lower side in the punch and die set exchanging apparatus 23.

Figure 15:
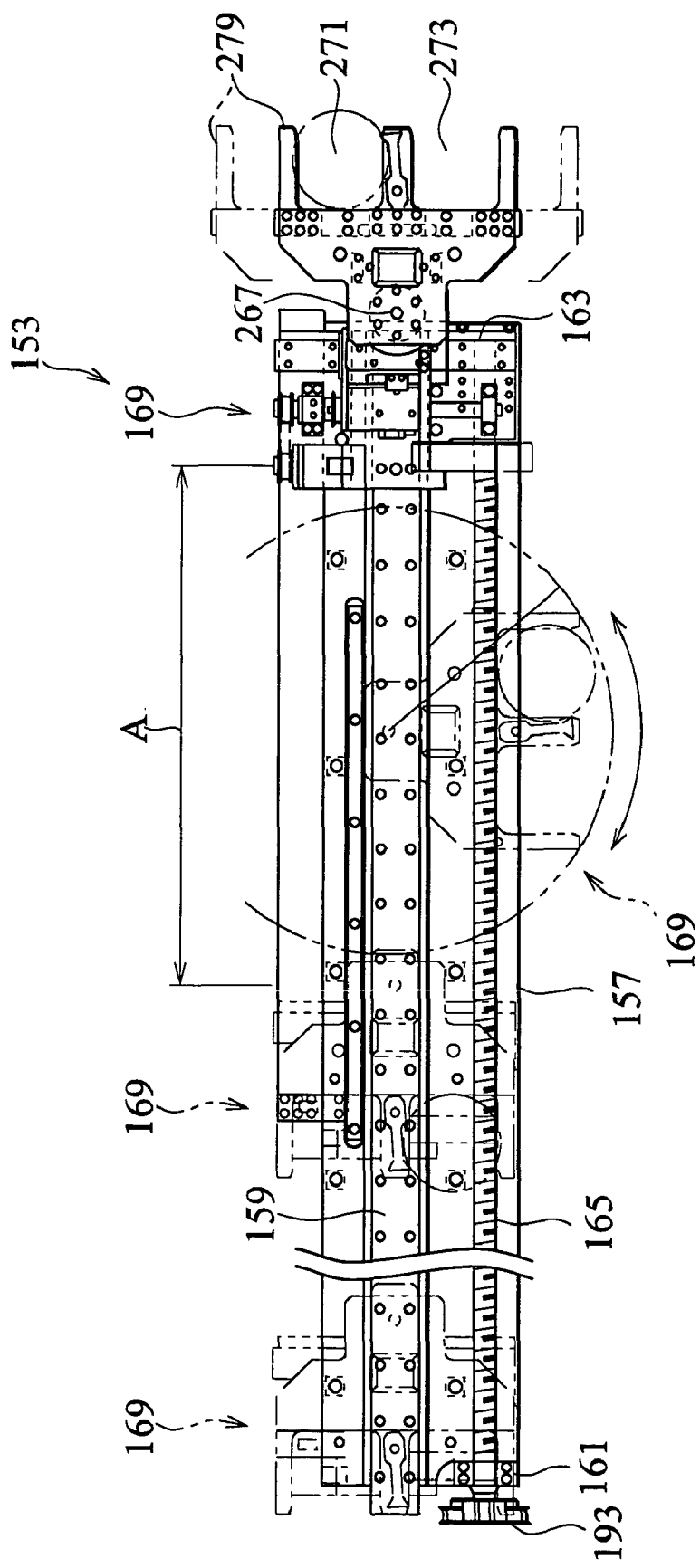
FIG. 15 is a bottom view of a punch exchanging apparatus seen from direction XV in FIG. 14.

Referring to FIG. 14 and FIG. 15 in combination, a frame 157 is provided horizontally in the punch exchanging apparatus 153 so as to extend from a punch and die set delivery position T where a punch P is received from the punch and die set accommodating apparatus 21 to a punch and die set exchanging position K where a punch P is attached to/detached from the punch press 1, and a guide rail 159 is provided on a lower face of the frame 157 (this side on the drawing in FIG. 15). Further, a ball screw 165 is rotatably provided at bearings 161, 163 provided at front and rear both end portion of the frame 157 (left and right both end portions in FIG. 15) in parallel with the guide rail 159.

Figure 17:
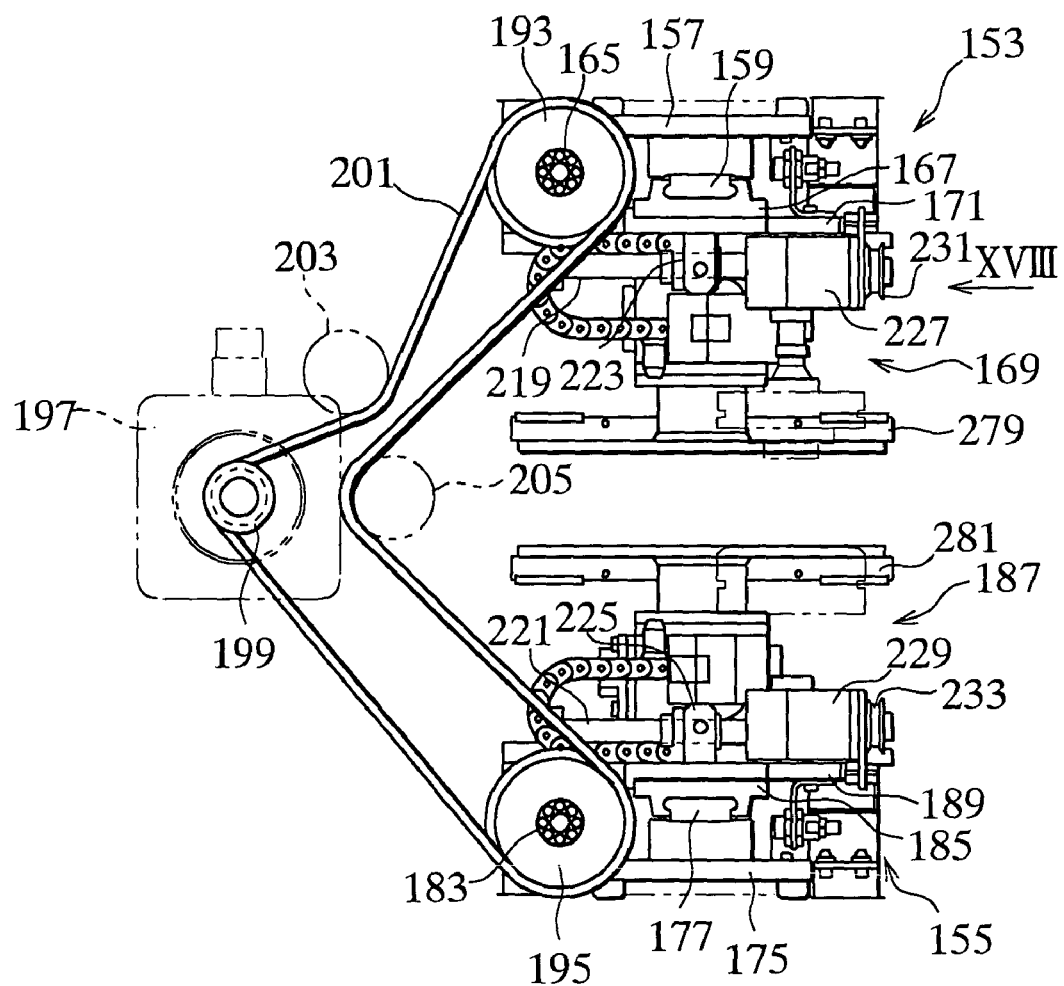
FIG. 17 is a side view seen from direction XVII in FIG. 14.

Referring to FIG. 15 and FIG. 17, a punch exchanging shuttle 169 serving as a punch conveying member is movably provided to the guide rail 159 via a slider 167 in an interior of the gate-shaped frame 3, so that compactness of the punch and die set exchanging apparatus 23 is achieved. The above-described slider 167 is mounted on an upper face of a punch exchanging apparatus base plate 171 of the punch exchanging shuttle 169.

A ball nut 173 (refer to FIG. 18) screwed to the above-described ball screw 165 is mounted to the punch exchanging apparatus base plate 171, and when the ball screw 165 is rotated, the punch exchanging shuttle 169 is moved along the guide rail 159 according to action of the ball nut 173.

Therefore, a next punch and die set can be prepared even during working in the punch press 1, so that shortening of a punch and die set exchanging time can be achieved.

Figure 16:
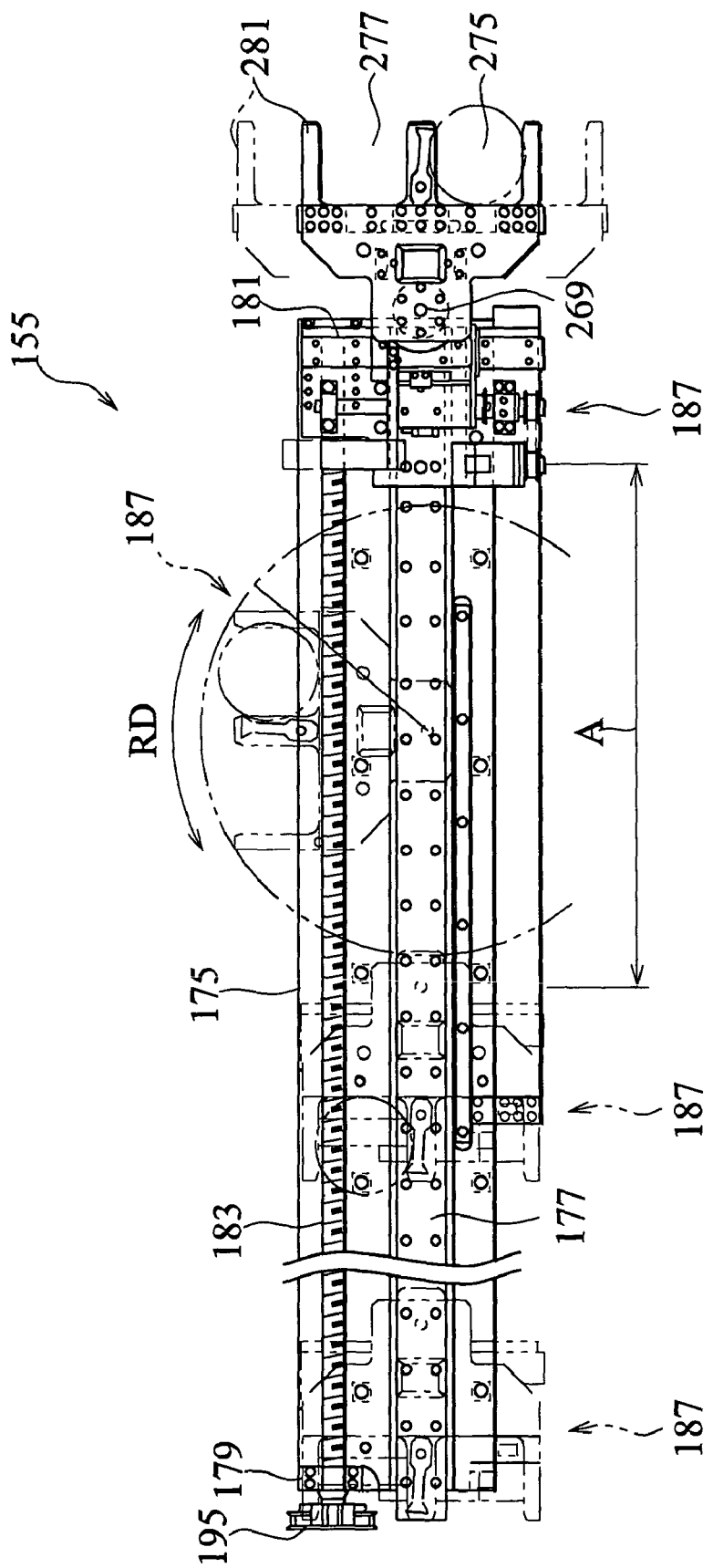
FIG. 16 is a plan view of a die exchanging apparatus seen from direction XVI in FIG. 14.

Referring to FIG. 14 and FIG. 16 in combination, like the above-described punch exchanging apparatus 153, a frame 175 is provided horizontally in the die exchanging apparatus 155 so as to extend from a punch and die set delivery position T where a die D is received from the punch and die set accommodating apparatus 21 to a punch and die set exchanging position K where the die D is attached to/detached from the punch press 1, and a guide rail 177 is provided on an upper face of the frame 175 (this side on the drawing in FIG. 16). Further, a ball screw 183 is rotatably provided at bearings 179, 181 provided at front and rear both end portions of the frame 175 (left and right both end portions in FIG. 16) in parallel with the guide rail 177.

Referring to FIG. 16 and FIG. 17, a die exchanging shuttle 187 is movably provided to the guide rail 177 via a slider 185, and the above-described slider 185 is mounted to an lower face of a die exchanging apparatus base plate 189 of the die exchanging shuttle 187. A ball nut 191 (parenthesized in FIG. 18) screwed to the above-described ball screw 183 is mounted to the die exchanging apparatus base plate 189, and when the ball screw 183 is rotated, the die exchanging shuttle 187 is moved along the guide rail 177 according to action of the ball nut 191.

Referring to FIG. 17, an idle pulley 193 is mounted at a rear end (a left side end portion in FIG. 14) of the ball screw 165 of the punch exchanging apparatus 153, and an idle pulley 195 is also mounted at a rear end of the ball screw 183 of the die exchanging apparatus 155. Then, a belt 201 is entrained to both the idle pulleys 193, 167 and a driving pulley 199 mounted to a driving motor 197, and the belt 201 is pressed by two press pulleys 203, 205 to be applied with a predetermined tension.

Accordingly, when the belt 201 is rotationally run by the driving motor 197, the upper and lower ball screws 165, 183 are rotated in synchronism with each other via the idle pulleys 193, 167, so that the punch exchanging shuttle 169 and the die exchanging shuttle 187 are moved in synchronism with each other according to actions of respective ball nuts 173, 191.

For this reason, since a next die can be prepared during working in the punch press 1, shortening of a punch and die set conveying time can be achieved.

Figure 18:
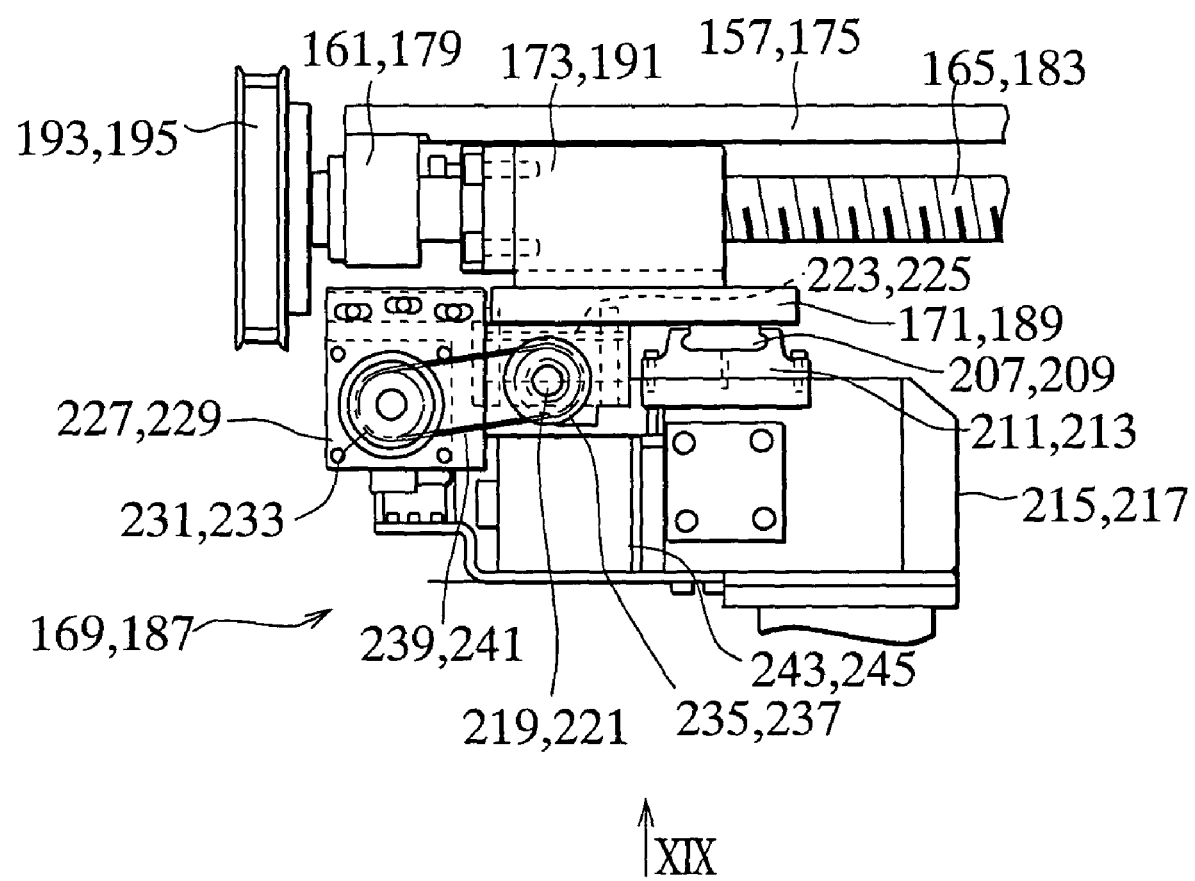
FIG. 18 is a side view of a punch exchanging shuttle in the punch exchanging apparatus.
Figure 19:
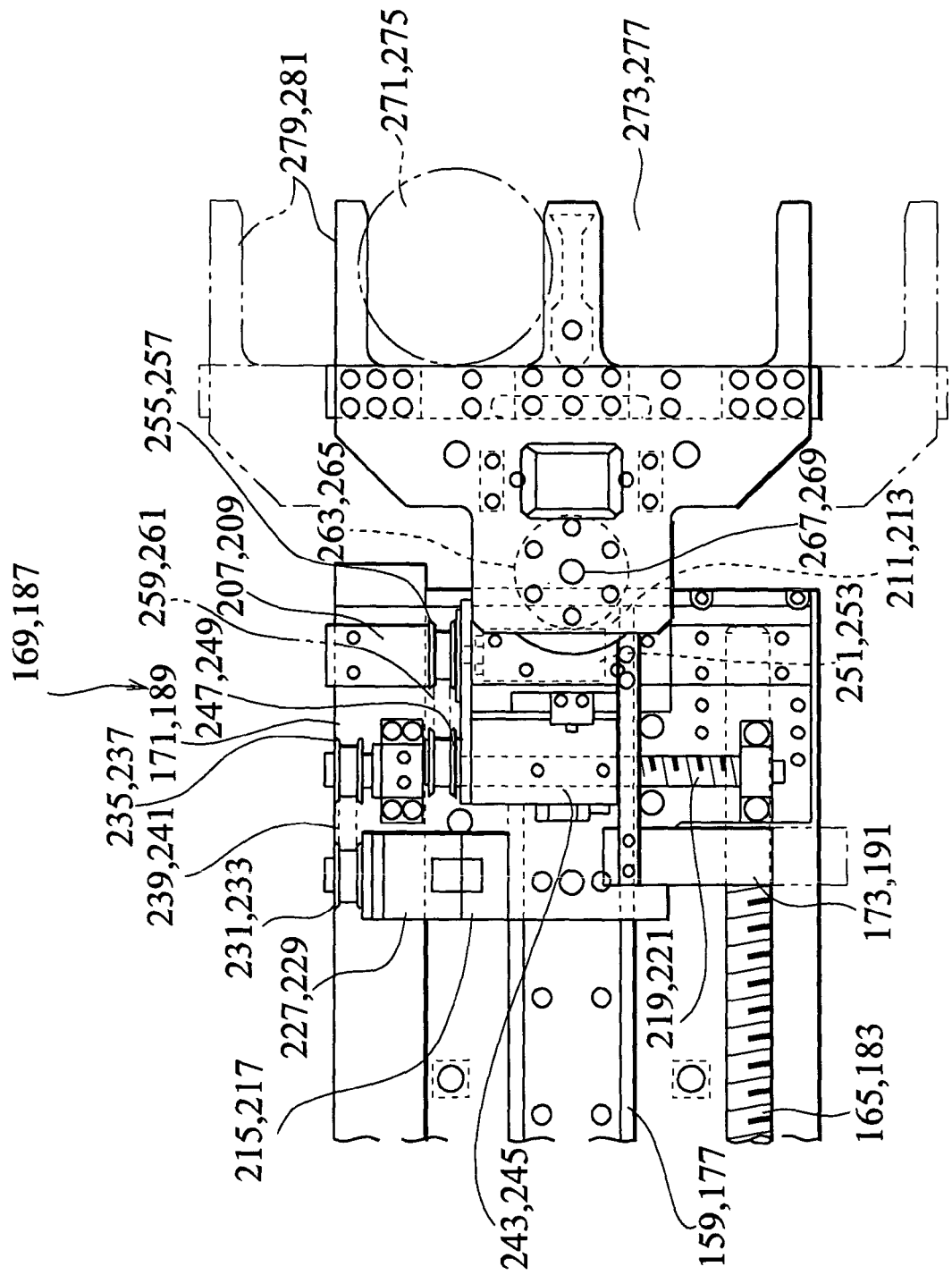
FIG. 19 is a plan view of the punch exchanging shuttle.

Next, the punch exchanging shuttle 169 will be explained with reference to FIG. 17 to FIG. 19. Incidentally, since the die exchanging shuttle 187 is constituted by turning the punch exchanging shuttle 169 upside down, repeated explanation will be omitted by denoting corresponding portions in the die exchanging shuttle 187 with parenthesized reference numerals.

A guide rail 207 (a guide rail 209) is provided on a lower face of the punch exchanging apparatus base plate 171 (the die exchanging apparatus base plate 189) of the punch exchanging shuttle 169 (the die exchanging shuttle 187) so as to extend in a direction (a direction perpendicular to the drawing in FIG. 18; a vertical direction in FIG. 19) perpendicular to a movement direction of the punch exchanging apparatus base plate 171 (the die exchanging apparatus base plate 189). A slider 211 (a slider 213) is movably provided on the guide rail 207 (the guide rail 209), and a punch exchanging apparatus body 215 (a die exchanging apparatus body 217) is mounted to the slider 211 (the slider 213).

A ball screw 219 (a ball screw 221) is rotatably provided on a lower face of the punch exchanging apparatus base plate 171 (the die exchanging apparatus base plate 189) in parallel with the above-described guide rail 207 (the guide rail 209), and a ball nut 223 (a ball nut 225) screwed to the ball screw 219 (the ball screw 221) to move is mounted on the punch exchanging apparatus body 215 (the die exchanging apparatus body 217). A driving motor 227 (a driving motor 229) is mounted to the punch exchanging apparatus base plate 171 (the die exchanging apparatus base plate 189), a driving pulley 231 (a driving pulley 233) is mounted to a rotational shaft of the driving motor 227 (the driving motor 229), and a belt 239 (a belt 241) is entrained about the driving pulley 231 (the driving pulley 233) and an idle pulley 235 (an idle pulley 237) mounted to an end portion of the ball screw 219 (the ball screw 221).

Accordingly, when the driving motor 227 (the driving motor 229) rotates the ball screw 219 (the ball screw 221), the punch exchanging apparatus body 215 (the die exchanging apparatus body 217) is moved in left and right directions (a direction perpendicular to the drawing in FIG. 18; upward and downward directions in FIG. 19) according to action of the ball nut 223 (the ball nut 225).

Further, a pivoting motor 243 (a pivoting motor 245) is provided on a lower portion (a lower portion in FIG. 18) of the punch exchanging apparatus body 215 (the die exchanging apparatus body 217), and a driving pulley 247 (a driving pulley 249) is mounted to a rotational shaft of the pivoting motor 243 (the pivoting motor 245). A worm gear 251 (a worm gear 253) is rotatably provided on a right side of the pivoting motor 243 (the pivoting motor 245) in FIG. 19, and a belt 259 (a belt 261) is entrained about an idle pulley 255 (an idle pulley 257) mounted to an end portion of the worm gear 251 (the worm gear 253) and the above-described driving pulley 247 (the driving pulley 249).

Furthermore, a worm wheel 263 (a worm wheel 265) with which the above-described worm gear 251 (the worm gear 253) meshes is rotatably provided on the punch exchanging apparatus body 215 (the die exchanging apparatus body 217), and a pivoting shaft 267 (a pivoting shaft 269) extending downwardly (downwardly in FIG. 18) is provided on a center shaft of the worm wheel 263 (the worm wheel 265).

A punch exchanging hand 279 serving as a punch holding arm (a die exchanging hand 281 serving as a die holding arm), which is provided with two first and second punch holding portions 271, 273 (first and second die holding portions 275, 277) each gasping a punch P, is provided on the pivoting shaft 267 (the pivoting shaft 269).

Accordingly, when the pivoting motor 243 (the pivoting motor 245) rotates the worm gear 251 (the worm gear 253) via the belt 259 (the belt 261), the meshing worm wheel 263 (the worm wheel 265) rotates to rotate the pivoting shaft 267 (the pivoting shaft 269), so that the punch exchanging hand 279 (the die exchanging hand 281) is pivoted.

For this reason, the direction of the punch exchanging hand 279 (the die exchanging hand 281) which has received a punch and die set in a state that the punch exchanging hand 279 has been directed toward the punch and die set accommodating apparatus 21 can be changed to a direction toward the punch press 1 side.

Next, the punch and die set accommodating apparatus 21 will be explained.

Figure 20:
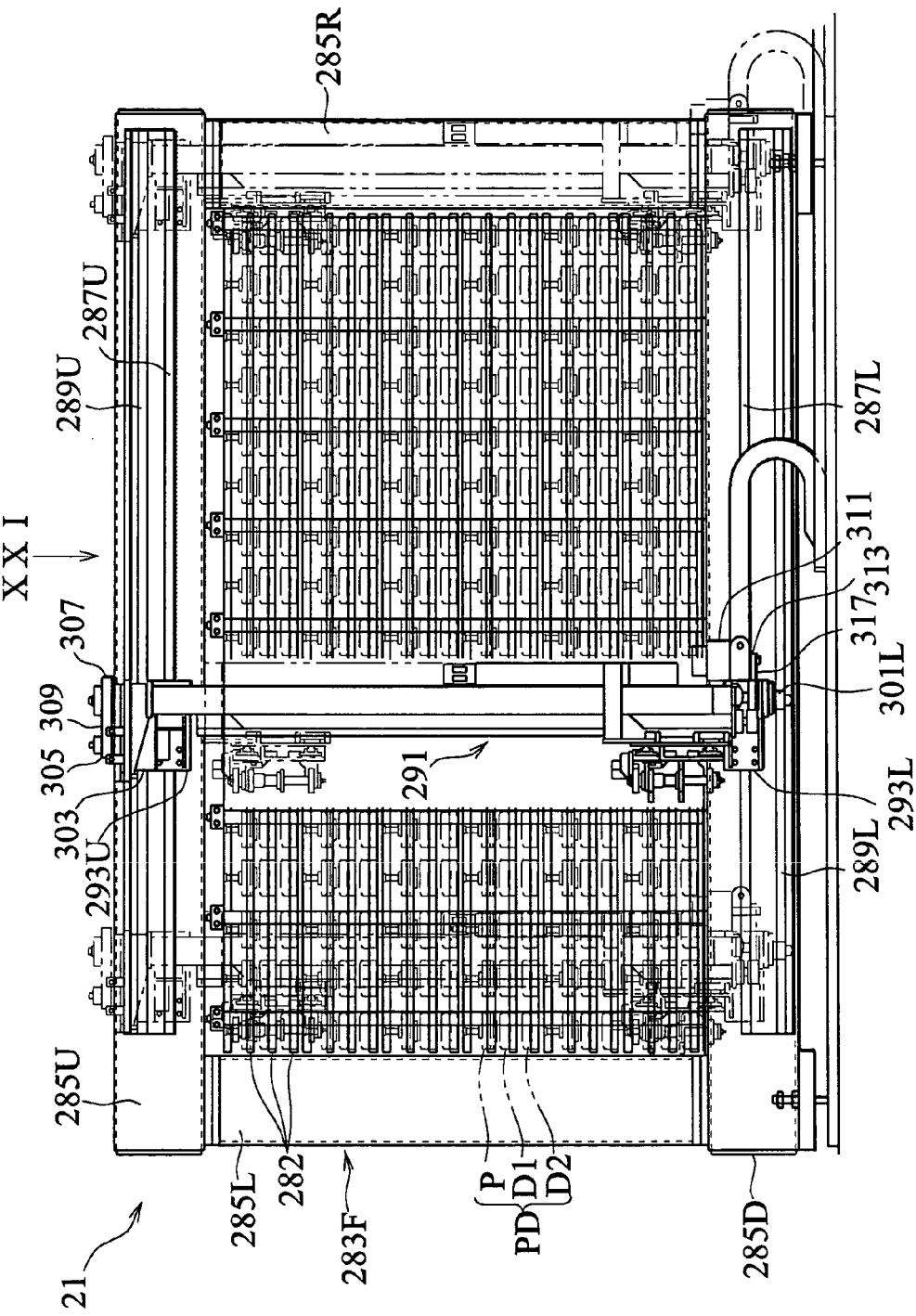
FIG. 20 is a front view of a first punch and die set accommodating shelf.
Figure 21:
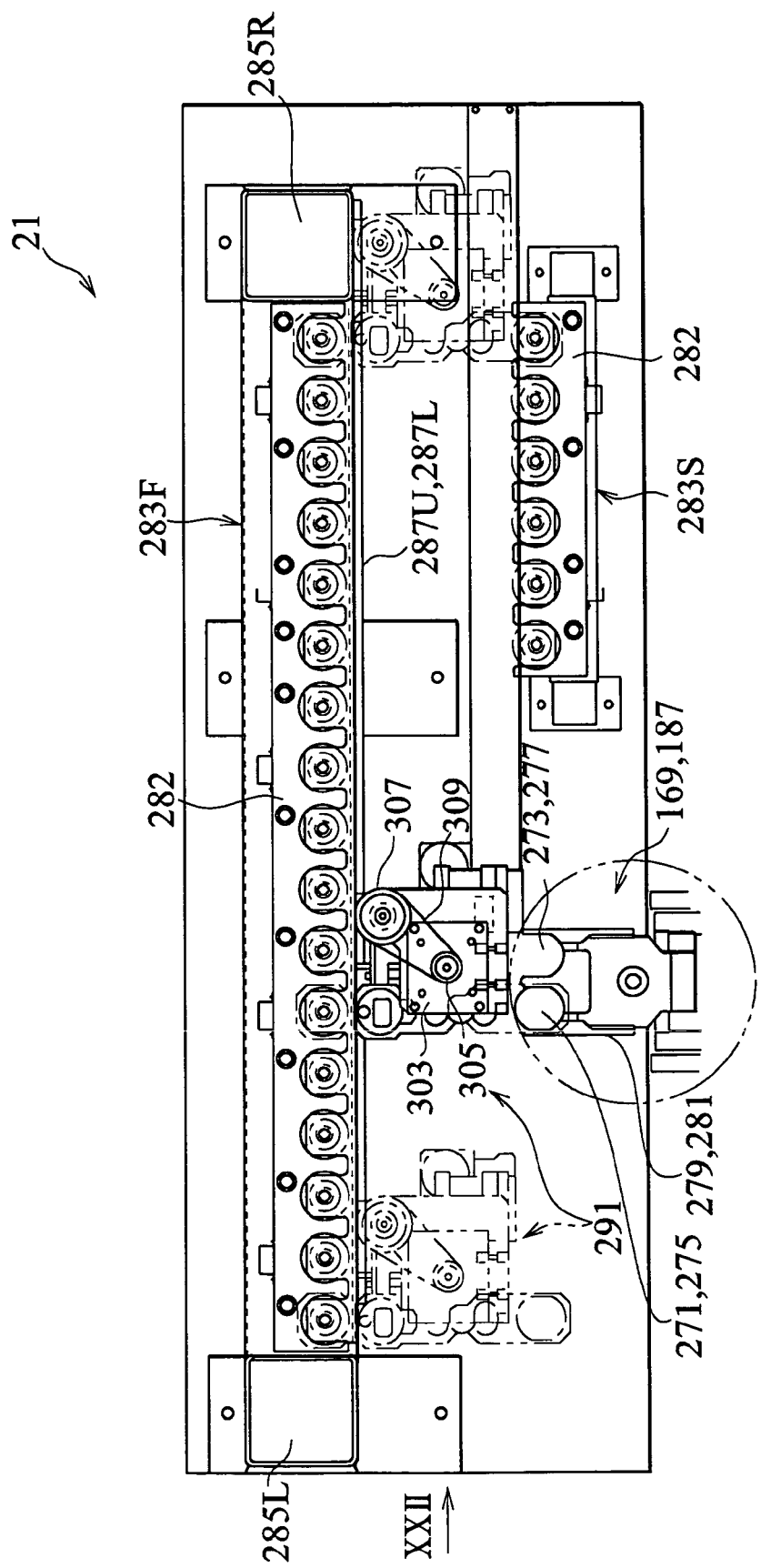
FIG. 21 is a plan view of a punch and die set accommodating portion seen from direction XXI in FIG. 20.
Figure 22:
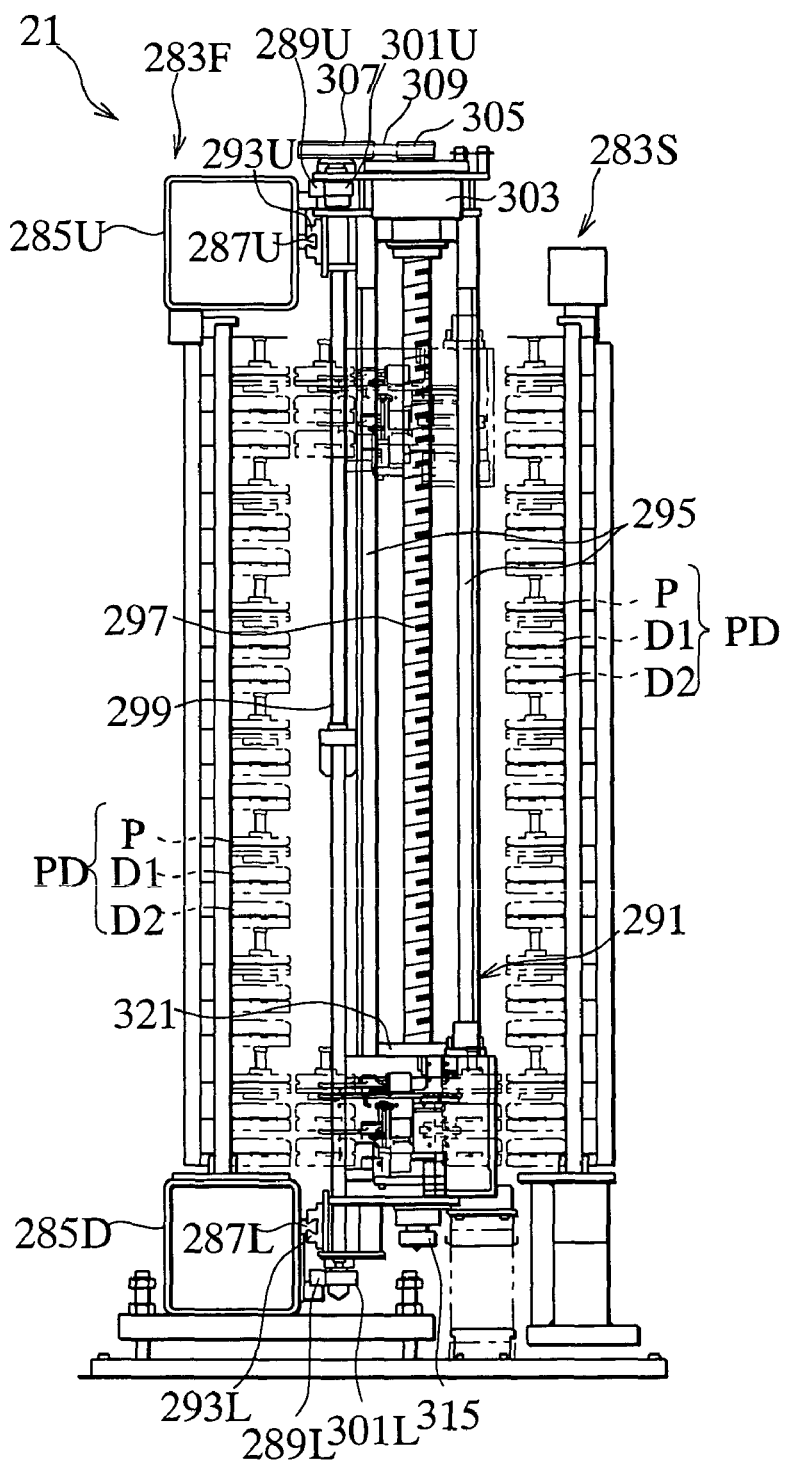
FIG. 22 is a side view seen from direction XXII in FIG. 21.

Referring to FIG. 20 to FIG. 22, the punch and die set accommodating apparatus 21 is provided with a first die accommodating shelf 283F serving as a multi-stage and multi-line rack, which has a plurality of shelves 282 each serving as a punch and die set accommodating portion which accommodates punch-die sets PD comprising one punch P and two dies D1, D2 and which serves as a punch accommodating shelf and a die accommodating shelf and a second punch and die set accommodating shelf 283S opposed to the first punch and die set accommodating shelf 283F. Accordingly, a plurality of combinations of a punch and a die can be accommodated in a small space, and, for example, working corresponding to various sizes of plate thickness or the like can be made by selecting a die D corresponding to one punch P.

The width of the second punch and die set accommodating shelf 283S is formed to be smaller than that of the first punch and die set accommodating shelf 283F. The respective punch and die set accommodating shelves 283F and 283S are constituted so as to engage the punch attaching groove 137 of a punch P to hold the punch P and similarly engage the die attaching grooves 149 of dies D to hold the dies D1, D2.

Upper, lower, left and right frames 285U, 285D, 285L and 285R are provided around the first punch and die set accommodating shelf 283F. Guide rails 287U and 287L are respectively provided on front faces (a right side face in FIG. 22) of the upper and lower frames 285U and 285L of the first punch and die set accommodating shelf 283F between the first punch and die set accommodating shelf 283F and the second punch and die set accommodating shelf 283S, and racks 289U and 289L are provided in parallel on upper and lower outsides of the guide rails 287U and 287L.

A picking robot 291 are movably provided along the upper and lower guide rails 287U and 287L. That is, sliders 293U and 293L movable along the above-described guide rails 287U and 287L are provided, and both the sliders 293U and 293L are coupled to each other by a pair of guide rails 295.

Further, a ball screw 297 is rotatably provided between both the sliders 293U and 293L. Furthermore, a shaft 299 is rotatably provided between both the sliders 293U and 293L, and pinions 301U and 301L meshing with the above-described racks 289U and 289L are provided at upper and lower both end portions of the shaft 299.

A self-traveling motor 303 for movement along the guide rails 287U and 287L is provided on the upper side slider 293U, and a driving pulley 305 mounted to a rotational shaft of the self-traveling motor 303 and an idle pulley 307 mounted to an upper end portion of the shaft 299 are coupled to each other by a belt 309.

On the other hand, a vertical movement motor 311 for moving the picking robot 291 vertically is provided at the lower side slider 293L, and a driving pulley 313 mounted to a rotational shaft of the vertical movement motor 311 and an idle pulley 315 mounted to a lower end portion of the above-described ball screw 297 are coupled to each other by a belt 317.

Figure 23:
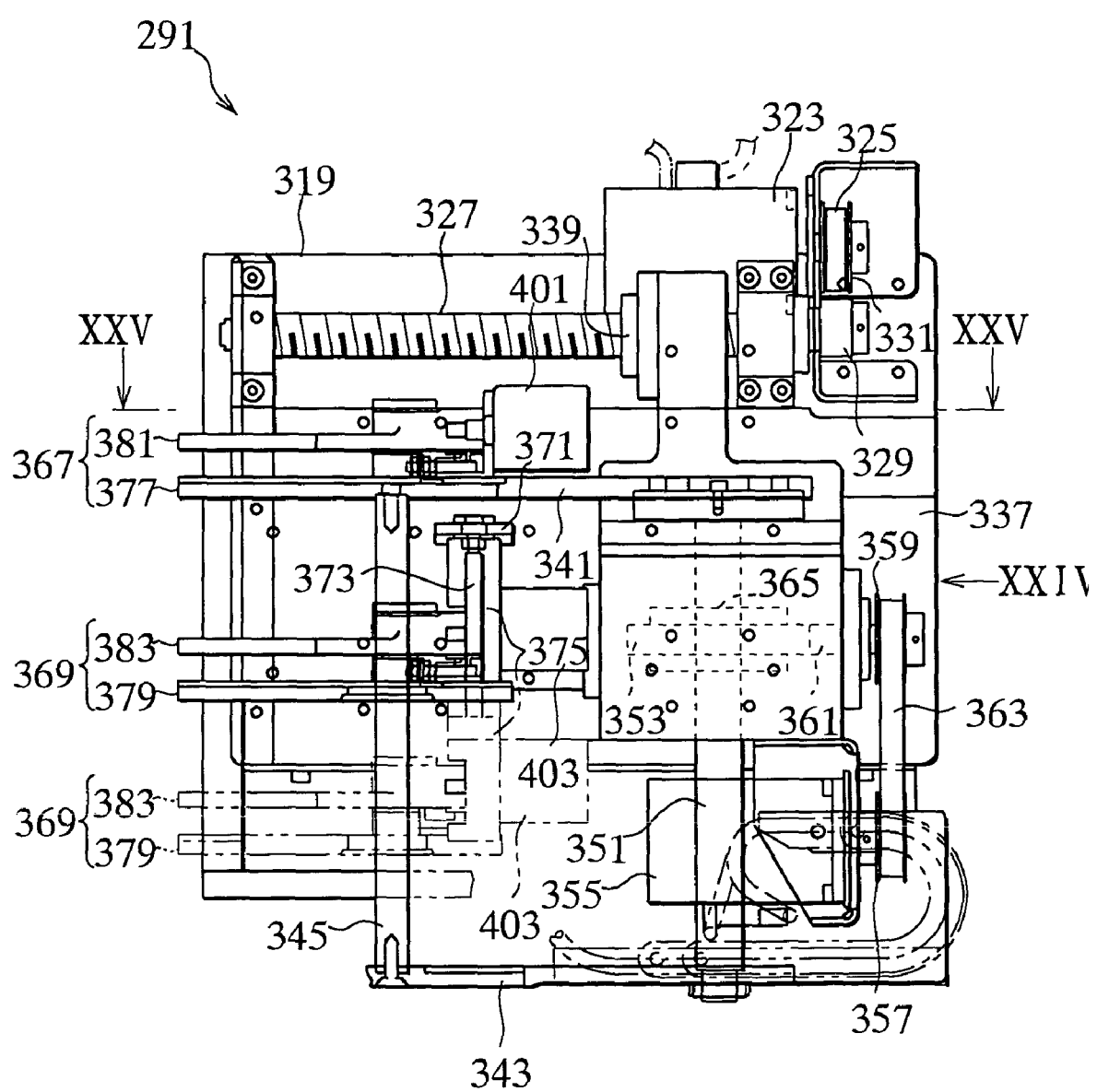
FIG. 23 is a front view of a picking robot.
Figure 24:
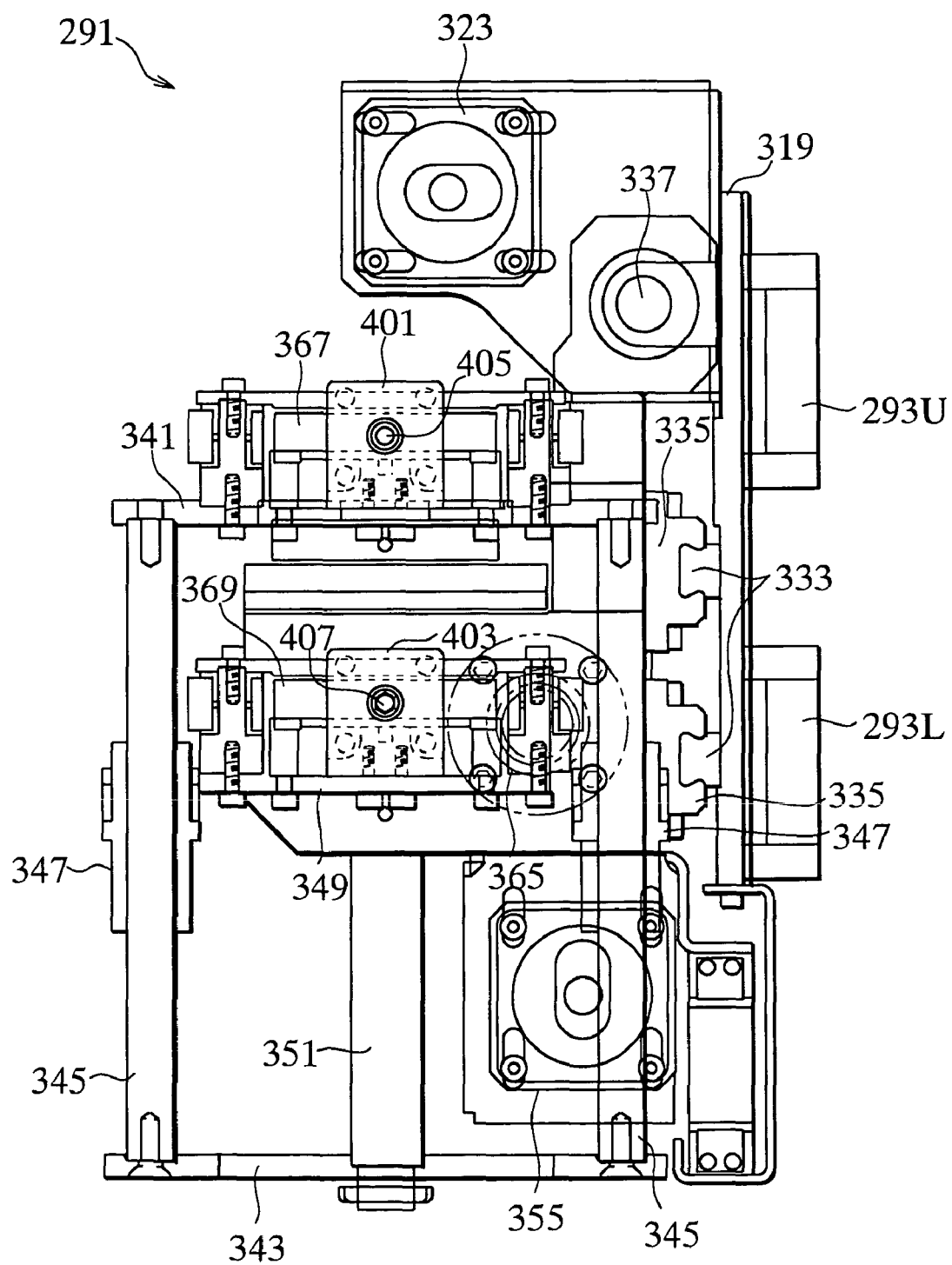
FIG. 24 is a side view seen from direction XXIV in FIG. 23.

Referring to FIG. 23 and FIG. 24, a slider 233 moving along the above-described guide rail 295 vertically is provided on a base plate 319 of the picking robot 291, and a ball nut 321 (refer to FIG. 22) screwed to the above-described ball screw 297 is mounted to the base plate 319.

Accordingly, since the self-traveling motor 303 rotates the shaft 299 so that the upper and lower pinions 301U and 301L are rotated in synchronism with each other, the picking robot 291 is moved along the guide rails 287U and 287L while maintaining a vertical state, so that the robot can be positioned at a desired horizontal position in the punch and die set accommodating shelf 283. Further, since the vertical movement motor 311 rotates the ball screw 297 so that the picking robot 291 is moved vertically along the guide rail 295 according to action of the ball nut 321, the picking robot 291 can be positioned at a desired vertical position in the punch and die set accommodating shelf 283.

Figure 25:
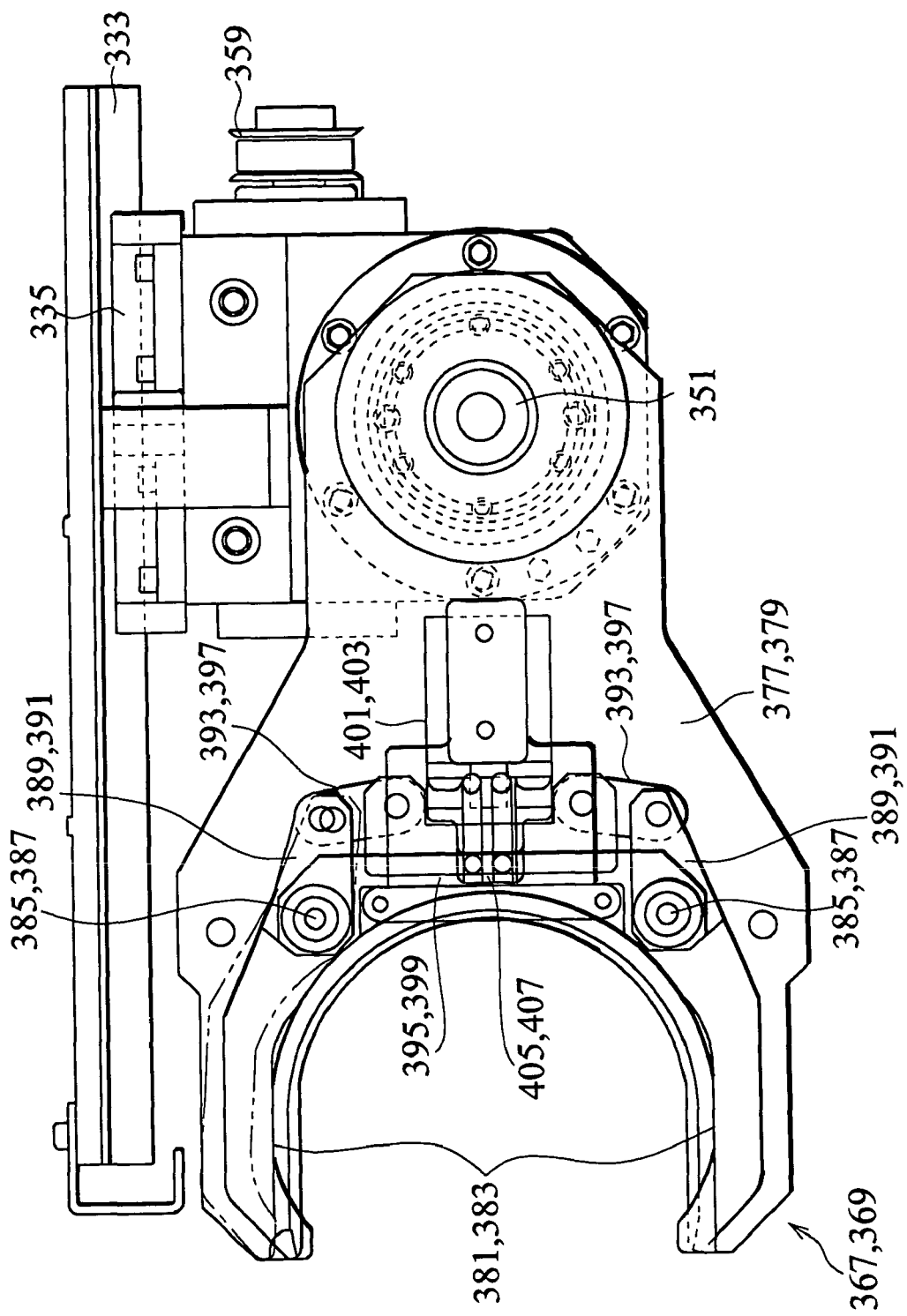
FIG. 25 is a sectional view of a position XXV-XXV in FIG. 23.

Referring to FIG. 23 to FIG. 25 in combination, a driving motor 323 for horizontal movement is provided at a front (this side on the drawing in FIG. 23) and upper end portion of the base plate 319 of the picking robot 291, and a driving pulley 325 is mounted to a rotational shaft. A ball screw 327 is provided below the driving motor 323 so as to extend in forward and rearward directions (left and right directions in FIG. 23) and horizontally, and a belt 331 is entrained about an idle pulley 329 mounted to an end portion of the ball screw 327 and a driving pulley 325 of the driving motor 323.

Further, a pair of upper and lower guide rails 333 are provided in forward and rearward directions and horizontally on a middle portion front face of the base plate 319. A movable base 337 which can be moved in forward and rearward directions (left and right directions in FIG. 23) by a slider 335 is provided on the guide rails 333, and a ball nut 339 screwed to the above-described ball screw 327 is mounted above the movable base 337.

Accordingly, when the driving motor 323 rotates the ball screw 327 via the belt 331, the movable base 337 is moved in forward and rearward directions (the left and right directions in FIG. 23) according to action of the ball nut 339.

A top plate 341 is mounted to a top end portion of a front face of the movable base 337 so as to extend in a horizontal direction, and a bottom plate 343 is mounted to a lower end portion thereof so as to extend in a horizontal direction. A pair of guide shafts 345 are provided between the top plate 341 and the bottom plate 343, and a moving stand 349 is provided so as to be movable vertically by a slider 347.

Further, a pivoting shaft 351 whose outer peripheral face is formed with a spline extending in a vertical direction is provided in a vertically direction to be pivotable between the top plate 341 and the bottom plate 343, and a worm wheel 353 is mounted to the pivoting shaft 351 so as to be movable vertically relative thereto and be rotated integrally therewith. On one hand, a pivoting motor 355 is provided at a lower portion on the moving stand 349, and a driving pulley 357 is mounted to a rotational shaft of the pivoting motor 355.

Furthermore, a rotational shaft 361 where an idle pulley 359 has been mounted on a right side end portion in FIG. 23 is provided on an upper side of pivoting motor 355 in the moving stand 349, and a belt 363 is entrained between the idle pulley 359 and the driving pulley 357 of the pivoting motor 355. A worm gear 365 meshing with the above-described worm wheel 353 is mounted to the rotational shaft 361.

Moreover, a punch taking-out and taking-in arm 367 for clamping a punch P accommodated in the punch and die set accommodating shelf 283 is mounted at an upper end portion of the pivoting shaft 351 so as to be pivotable together with the pivoting shaft 351 at a fixed height position. Further, a die taking-out and taking-in arm 369 for clamping a die D is mounted to the moving stand 349 so as to be pivotable together with the pivoting shaft 351.

Further, a block 371 is mounted below the top plate 341 on the front face of the movable base 337, and a lower face of a cylinder 375 where a distal end of a piston rod 373 has been fixed to the block 371 is fixed to the die taking-out and taking-in arm 369. The die taking-out and taking-in arm 369 is switched to an upper stage (a position shown with a solid line in FIG. 23) or a lower stage (a position shown with a double dotted line in FIG. 23) according to action of the cylinder 375, so that a desired one of the upper and lower two dies D1, D2 accommodated in the punch and die set accommodating shelf 283 can be clamped selectively.

Accordingly, when the pivoting motor 355 rotates the rotational shaft 361 via the belt 363, the worm wheel 353 is rotated according to rotation of worm gear 365 to pivot the pivoting shaft 351, so that the punch taking-out and taking-in arm 367 is pivoted at a predetermined position and the die taking-out and taking-in arm 369 is pivoted at the upper stage position or the lower stage position switched by the cylinder 375.

Thus, since a punch P is held by the punch taking-out and taking-in arm 367 and a die D is held by the die taking-out and taking-in arm 369 so that taking-out or taking-in of a punch-die set is performed simultaneously, an exchanging time of a punch P and a die D can be shortened.

Referring to FIG. 23 and FIG. 25, the punch taking-out and taking-in arm 367 will be explained. Incidentally, the die taking-out and taking-in arm 369 has a constitution completely identical to that of the punch taking-out and taking-in arm 367, corresponding portions thereof are described in a parenthesized manner and repeated explanation will be omitted.

The punch taking-out and taking-in arm 367 (the die taking-out and taking-in arm 369) has a clamper body 377 (a clamper body 379) whose distal end portion mounted so as to be rotated integrally with the above-described pivoting shaft 351 is bifurcated, and the clamper body 377 supports a bottom face of a punch P (a die D) from its lower side.

Further, a pair of clamp claws 381 (clamp claws 383) is provided so as to be openable/closable about an opening/closing center 385 (an opening/closing center 387) on an upper side of the clamper body 377 (the clamper body 379) in order to clamp the punch exchanging grooves 139 (the die exchanging grooves 151) of a punch P (a die D).

A lever portion 389 (a lever portion 391) projects at a rear portion (a right side portion in FIG. 25) of each clamp claw 381 (each clamp claw 383), and a distal end portion (a right side distal end in FIG. 25) of the lever portion 389 (the lever portion 391) is coupled to a distal end of a piston rod 405 (a piston rod 407) of an opening/closing cylinder 401 (the opening/closing cylinder 403) via link members 393, 395 (link members 397, 399).

Accordingly, the piston rod 405 (the piston rod 407) of the opening/closing cylinder 401 (the opening/closing cylinder 403) is pushed out to advance the punch taking-out and taking-in arm 367 (the die taking-out and taking-in arm 369) in a state that the clamp claws 381 (the clamp claws 383) have been opened, thereby inserting the clamper body 377 (the clamper body 379) under a punch P (a die D), and the piston rod 405 (the piston rod 407) of the opening/closing cylinder 401 (the opening/closing cylinder 403) is retracted to close the clamp claws 381 (the clamp claws 383), thereby clamping the punch P (the die D).

Next, a punch and die exchanging operation will be explained. First, an operation for taking a punch and a die to be used next out of the die accommodating apparatus 21 and accommodating used punch and die therein will be explained. Incidentally, since a punch and die exchanging operation of punches P and an exchanging operation of dies D are generally common to each other, corresponding steps regarding the die D are described in a parenthesized manner and repeated explanation will be omitted.

Referring to FIG. 20 to FIG. 22, the picking robot 291 is moved along the guide rails 287U, 287L provided on the front face of the first punch and die accommodating shelf 283F and moved vertically, and the punch taking-out and taking-in arm 367 and the die taking-out and taking-in arm 369 are positioned at positions corresponding to a desired punch P and a desired die D1 or D2 accommodated in the first punch and die accommodating shelf 283F or the second punch and die accommodating shelf 283S of the punch and die accommodating apparatus 21.

Referring to FIG. 26A to FIG. 26D, in case that a punch P (a die D) is taken out of the first punch and die accommodating shelf 283F, the punch taking-out and taking-in arm 367 (the die taking-out and taking-in arm 369) is pivoted and advanced in a direction of the first punch and die accommodating shelf 283F (refer to FIG. 26A), the clamper body 377 (the clamper body 379) of the punch taking-out and taking-in arm 367 (the die taking-out and taking-in arm 369) is inserted under a punch P (a die D) so that the punch P (the die D) is grasped by the clamp claws 381 (the clamp claws 383). At this time, the die taking-out and taking-in arm 369 is positioned at the upper stage position by the cylinder 375 when there is a desired die D in the upper stage of the punch and die accommodating shelf 283, and it is positioned at the lower stage position when there is a desired one in the lower stage of the punch and die accommodating shelf 283.

Figure 26A:
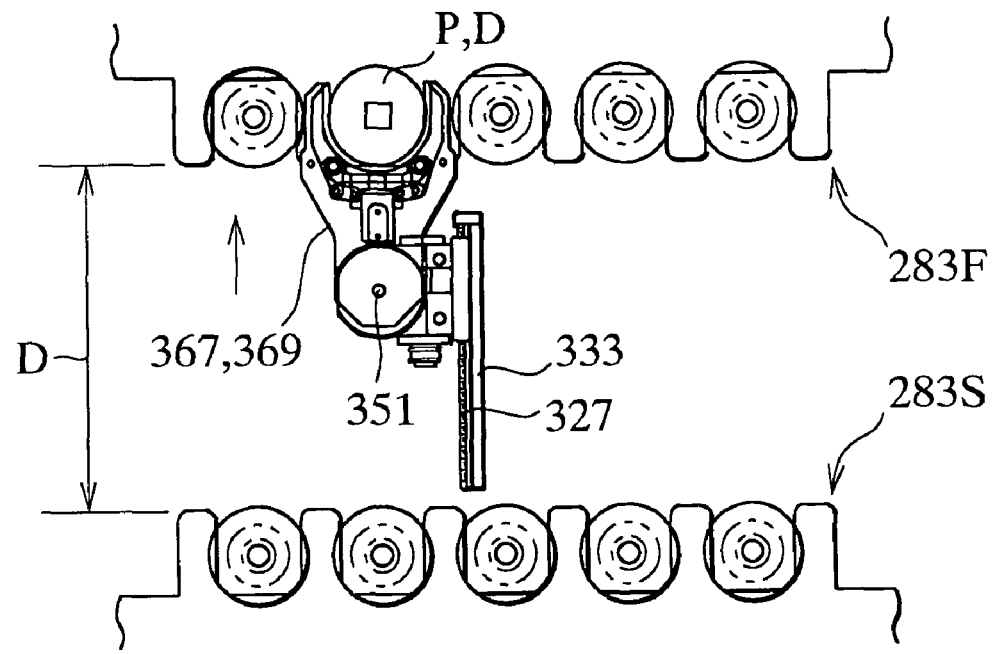
FIG. 26A to FIG. 26D are explanatory views showing steps for taking out a punch and die set from the punch and die set accommodating shelf.
Figure 26B:
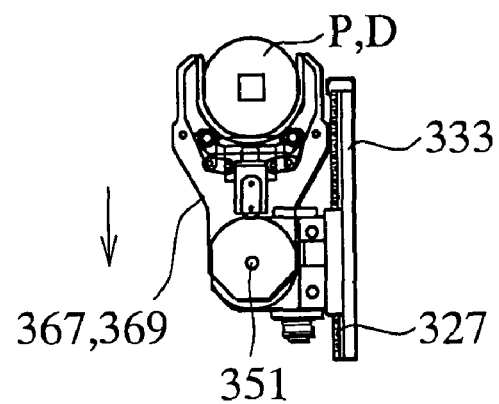
Figure 26C:
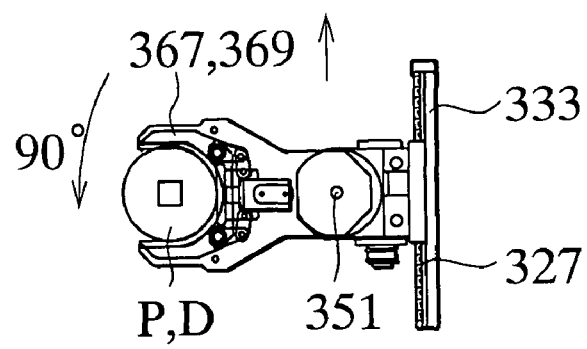
Figure 26D:
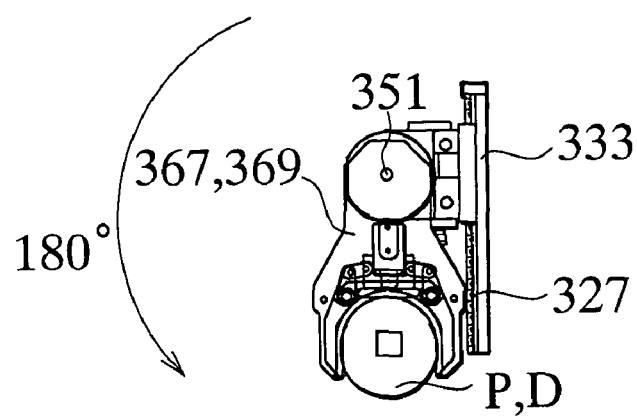
Figure 27:
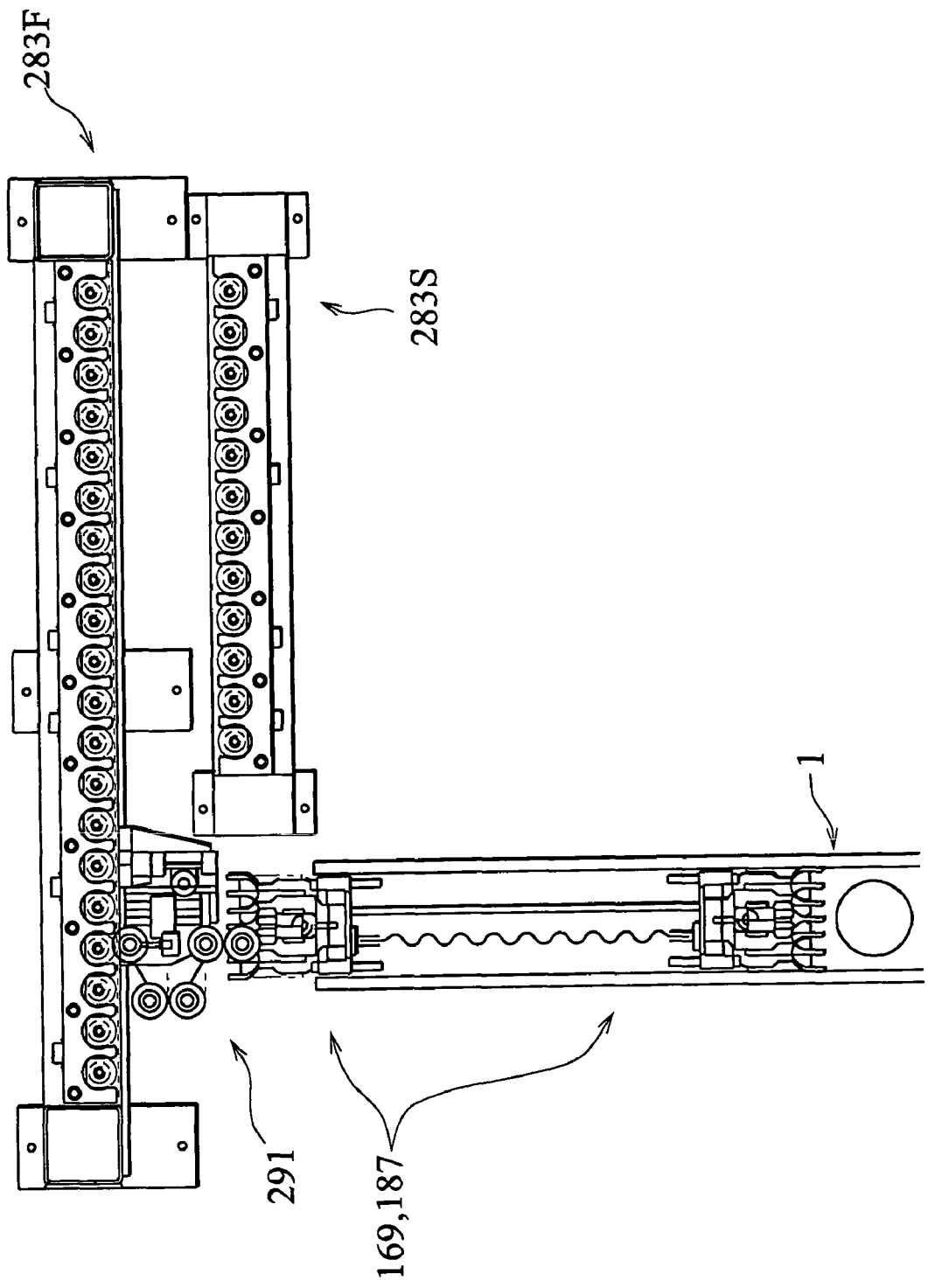
FIG. 27 is a plan view showing a delivery position of a punch and die set between the punch and die set accommodating portion and the punch and die set exchanging apparatus.

After the punch P (the die D) is clamped, the punch taking-out and taking-in arm 367 (the die taking-out and taking-in arm 369) is retracted to a midway position (downward in FIG. 26A to FIG. 26D) to take the punch P (the die D) out of the punch and die accommodating shelf 283 (refer to FIG. 26B), and the punch taking-out and taking-in arm 367 (the die taking-out and taking-in arm 369) is semi-pivoted by 90° (refer to FIG. 26C). Then, the punch taking-out and taking-in arm 367 (the die taking-out and taking-in arm 369) is advanced again (upward in FIG. 26A to FIG. 26D) and pivoted by 90° (a total of 180°)(refer to FIG. 26D).

Thereby, a distance D between the first punch and die set accommodating shelf 283F and the second punch and die set accommodating shelf 283S can be reduced, and space saving can be achieved. Incidentally, in case that a punch and a die are taken out of the second punch and die set accommodating shelf 283S, it is unnecessary to reverse the punch taking-out and taking-in arm 367 like the above-described case that a die is taken out of the first punch and die set accommodating shelf 283F.

Then, after the picking robot 291 is moved vertically and the picking robot 291 is moved, the punch taking-out and taking-in arm 367 (the die taking-out and taking-in arm 369) is retracted to position the grasping punch P (the grasping die D) to the punch and die delivery position T.

On one hand, when a used punch and die set is accommodated, on the contrary to the above-described taking-out case, the picking robot 291 receives the used punch P (the die D) from the punch exchanging shuttle 169 (the die exchanging shuttle 187) at the punch and die set delivery position T and moves the die such that the die is positioned at a desired position of the first punch and die set accommodating shelf 283F or the second punch and die set accommodating shelf 283S, and the picking robot 291 pivots and advances the punch taking-out and taking-in arm 367 (the die taking-out and taking-in arm 369) to insert the punch P (the die D) into the punch and die set accommodating shelf 283 and open the punch taking-out and taking-in arm 367 the die taking-out and taking-in arm 369), thereby unclamping he punch P (the die D).

Next, an operation for conveying a punch P and a die D taken out by the picking robot 291 into the punch press 1 will be explained. Incidentally, since an conveying-in operation of a punch P and an conveying-in operation of a die D are almost common to each other, the conveying-in operation of a punch P is described regarding the common portions in the following explanation, and the operation of a die D will be described in a bracketed manner.

Figure 28A:
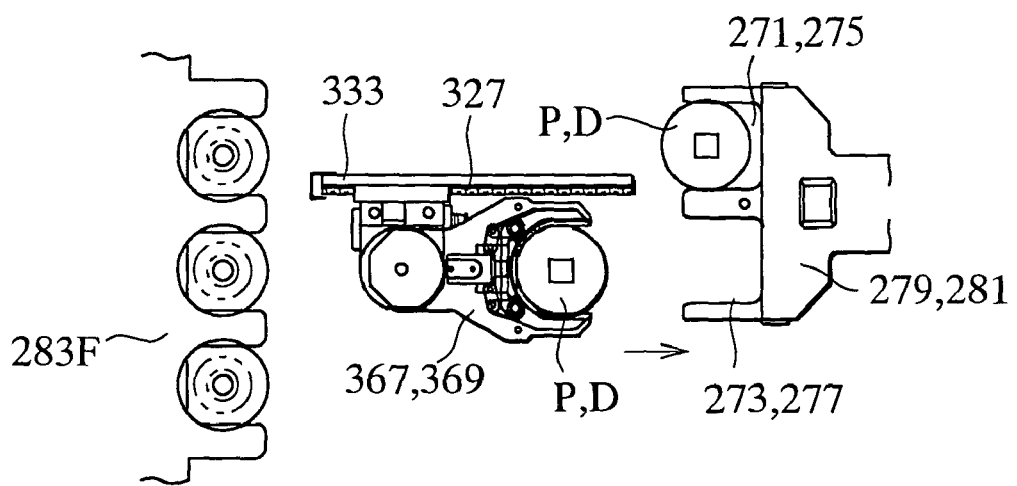
FIG. 28A to FIG. 28D are process views showing a punch and die set delivery procedure between the punch and die set accommodating portion and the punch and die set exchanging apparatus.
Figure 28B:
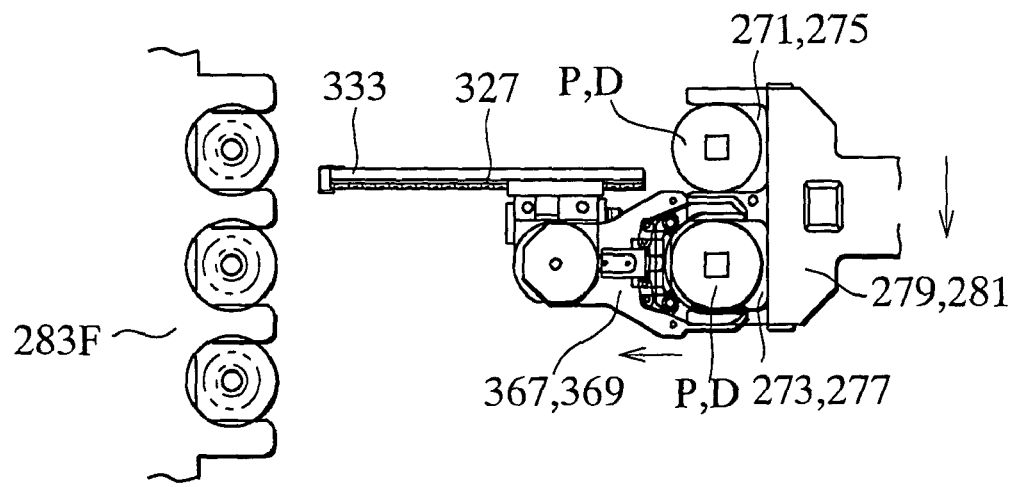

Referring to FIG. 21, FIG. 27 and FIG. 28A to FIG. 28D, empty one (for example, the second punch holding portion 273 (the second die holding portion 277)) of the two first and second punch holding portions 271, 273 (the first and second die holding portions 275, 277) of the punch exchanging hand 279 (the die exchanging hand 281) of the punch exchanging shuttle 169 (the die exchanging shuttle 187) is positioned to the punch P (the die D) grasped by the punch taking-out and taking-in arm 367 (the die taking-out and taking-in arm 369) of the picking robot 291 to be positioned at the punch and die set delivery position T provided at a position parallel to the second punch and die set accommodating shelf 283S (refer to FIG. 28A), and the second punch holding portion 273 (the second die holding portion 277) of the punch exchanging hand 279 (the die exchanging hand 281) is inserted into the punch exchanging grooves 139 (the die exchanging grooves 151) of the punch P (the die D) grasped by the punch taking-out and taking-in arm 367 (the die taking-out and taking-in arm 369) (refer to FIG. 28B). Then, the punch P (the die D) is received by unclamping the punch taking-out and taking-in arm 367 (the die taking-our and taking-in arm 369). Since the punch and die set taking-out and taking-in apparatus is moved between the racks arranged so as to be opposed to each other and delivery between the punch and die set taking-out and taking-in apparatus and the punch and die set exchanging apparatus is performed at the punch and die set delivery position provided at a position parallel to the front side rack, space saving for the punch and die set accommodating apparatus can be achieved.

Figure 28C:
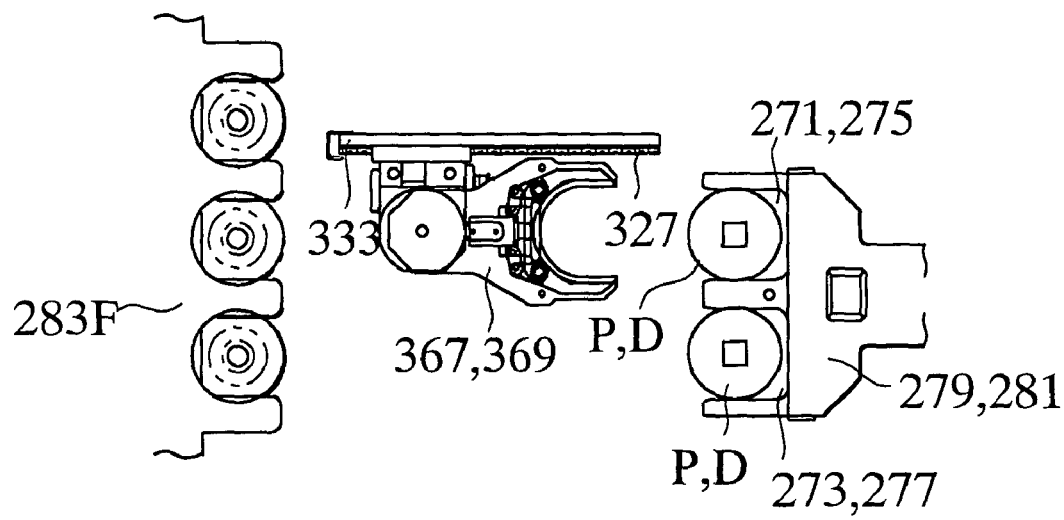

Next, in case that the punch exchanging hand 279 (the die exchanging hand 281) holds a punch P (a die D) to be accommodated in the punch and die set accommodating apparatus 21, the punch taking-out and taking-in arm 367 (the die taking-out and taking-in arm 369) is retracted and the punch exchanging hand 279 (the die exchanging hand 281) is moved laterally (downward in FIG. 28C) to position the first punch holding portion 271 (the first die holding portion 275) in front of empty punch taking-out and taking-in arm 367 (the die taking-out and taking-in arm 369) (refer to FIG. 28C).

Figure 28D:
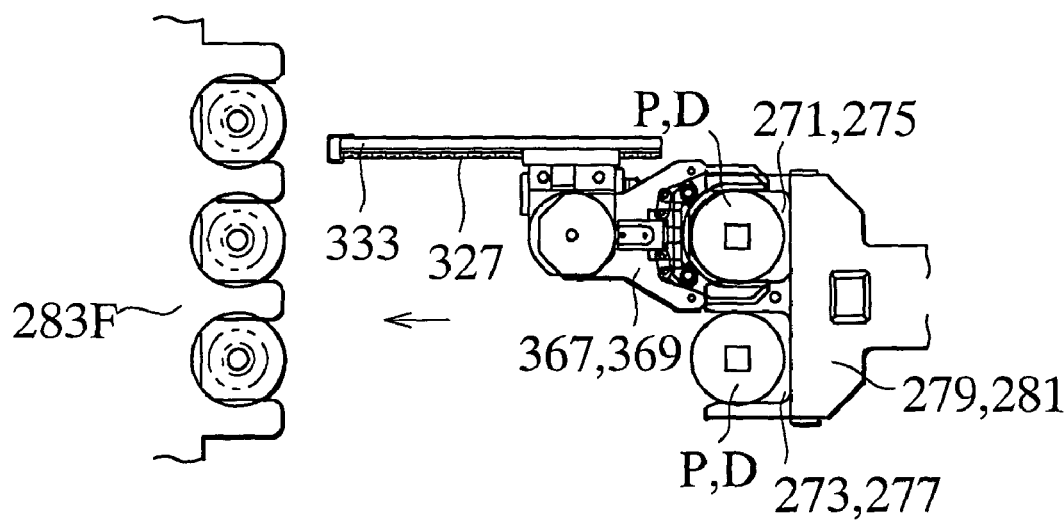

The punch taking-out and taking-in arm 367 (the die taking-out and taking-in arm 369) is advanced to clamp a punch P (a die D) held by the first punch holding portion 271 (the first die holding portion 275) of the punch exchanging hand 279 (the die exchanging hand 281) and is then retracted (refer to FIG. 28D).

Then, a punch exchanging shuttle 169 (the die exchanging shuttle 187) grasping a new punch P (a new die D) is moved in a direction of the punch press 1, and the punch exchanging hand 279 (the die exchanging hand 281) is pivoted by 180° (shown with RD in FIG. 16) to position the punch P (the die D) to the punch press 1 side, while moving over a section A shown in FIG. 15. Then, the punch exchanging shuttle 169 (the die exchanging shuttle 187) is further moved to position the punch exchanging hand 279 (the die exchanging hand 281) to the punch and die set exchanging position K.

Accordingly, a punch and die set can be taken out to be delivered to the punch exchanging hand 279 (the die exchanging hand 281) even in a small space. Further, since the picking robot 291 can prepare a next punch and die set to be put in a standby state while the punch exchanging hand 279 (the die exchanging hand 281) is being positioned at the punch and die set exchanging position K, shortening of a punch and die set exchanging time can be achieved. Furthermore, since the punch exchanging hand 279 (the die exchanging hand 281) is pivoted in a front or a rear direction, while the punch exchanging shuttle 169 (the die exchanging shuttle 187) is being moved forward or rearward of the punch and die set exchanging apparatus, a time is not required for pivoting. For this reason, a time required for punch and die set exchanging can be shortened.

Next, exchanging operations of a punch P and a die D to the punch press 1 will be explained. Incidentally, since the exchanging operation of a punch P and the exchanging operation of a die D are almost common to each other, the exchanging operation of a punch P will be described regarding the common portions in the following explanation and the die D will be described in a parenthesized manner.

When a punch P attached to the punch press 1 is detached therefrom, as shown in FIG. 10, the plate presser 85 is ascended by the plate presser vertical movement cylinder 65 and the lock claws 59 are descended by the locking cylinder 53 to release the pull stud 133 of the punch P and position the punch P at the exchanging height position. Further, the ascending/descending member 97 is descended by the ascending/descending motor 105 to descend the supporting stand 107 so that a lower end portion of the pin 125 is caused to abut on an upper end face of the upper supporting body 91U, and the die supporting block 121 is relatively ascended by the screw portion 125U of the pin 125 to achieve an unlock state and position the die D at the exchanging height position.

For this reason, since a punch P and a die D can be exchanged simultaneously and rapidly regardless of whether or not a workpiece W exists between the punch P and the die D, shortening of a punch and die set exchanging time can be achieved.

Figure 29A:
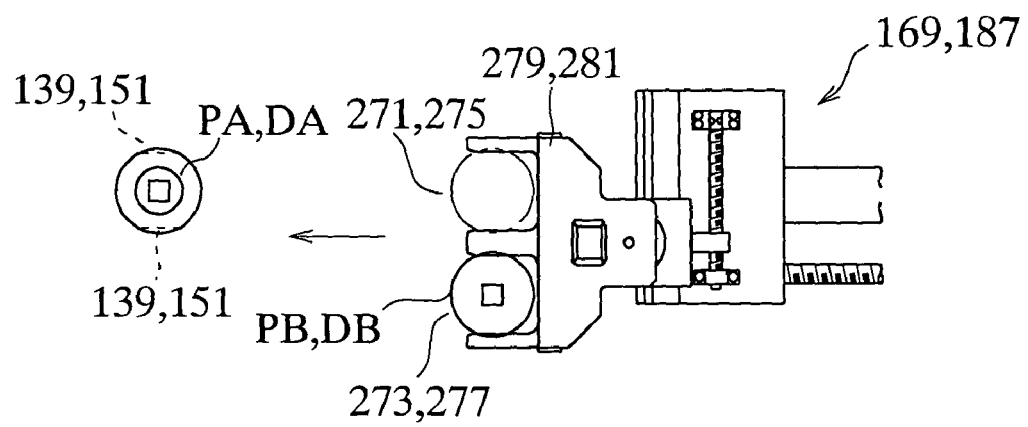
FIG. 29A to FIG. 29D are process views showing a procedure for detaching/attaching a punch and die set to a punch press by the punch and die set exchanging apparatus.
Figure 29B:
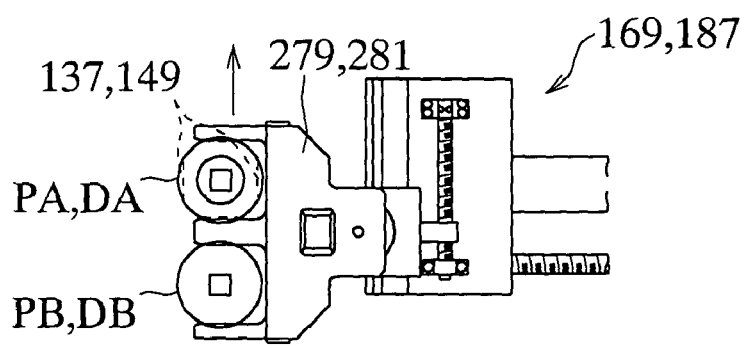

Next, referring to FIG. 29A to FIG. 29D, the punch exchanging shuttle 169 (the die exchanging shuttle 187) is advanced to approach to the punch press 1 in a state that the first and second punch holding portions 271, 273 (the first and second die holding portions 275, 277) of the punch exchanging hand 279 (the die exchanging hand 281) have been directed to the punch press 1 side (the left side in FIG. 29A to FIG. 29D) (refer to FIG. 29A). At this time, a direction in which the punch exchanging shuttle 169 (the die exchanging shuttle 187) advances corresponds to a direction of the punch exchanging groove 139 (the die exchanging groove 151) of the punch PA (the die DA), and the empty first punch holding portion 271 (the first die holding portion 275) is inserted into the punch exchanging grooves 139 (the die exchanging grooves 151).

Figure 29C:
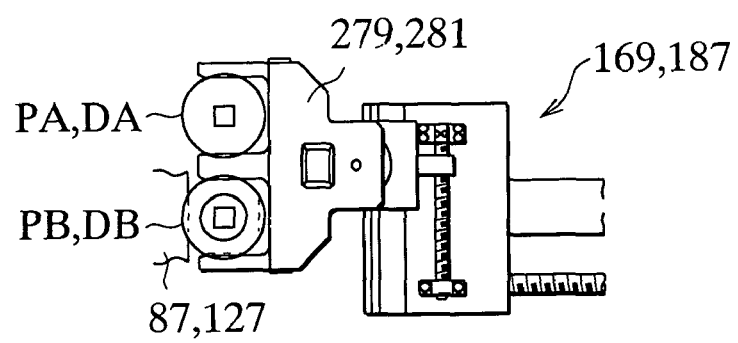
Figure 29D:
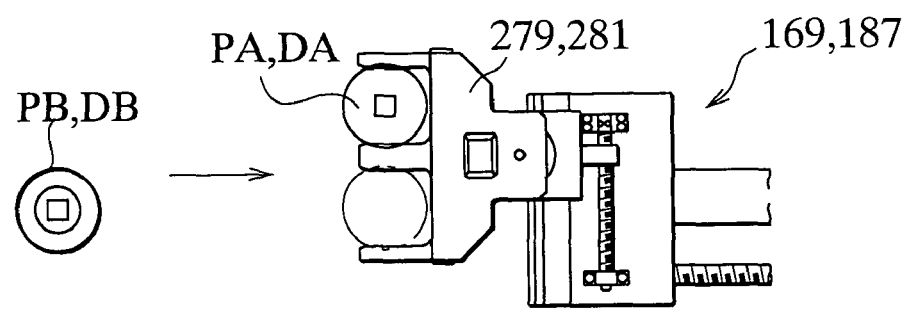

By moving the punch exchanging hand 279 (the die exchanging hand 281) in a direction perpendicular to an advancing direction (upward in FIG. 29B), the pull stud 133 of the punch P is moved smoothly through the notch C without interference, the punch PA (the die DA) attached to the punch press 1 is pulled out along the punch attaching grooves 137 (the die attaching grooves 149) (refer to FIG. 29B), and a new punch PB (a new die DB) held by the second punch holding portion 273 (the second die holding portion 277) is attached to the punch holding claws 87 (the die holding claws 127) (refer to FIG. 29C). At this time, the pull stud 133 of the punch P passes through the notch C smoothly. Thereafter, the punch exchanging shuttle 169 (the die exchanging shuttle 187) is retracted (refer to FIG. 29D). Since detaching of the punch PA (the die DA) and attaching of the punch PB (the die DB) can be performed simultaneously in this manner, a punch and die set exchanging time can be shortened.

Further, in case that the detached punch P (the detached die D) is re-used later, the punch P is held by one of the punch holding portions 271, 273 (the die holding portions 275, 277) as it is, the held punch P (the held die D) can be attached again by moving the punch exchanging hand 279 (the die exchanging hand 281) in the reverse direction after a new punch P (a new die D) has been used. Thereby, in case that two different kinds of punch and die sets are continuously used like a burring work, working efficiency can largely be improved.

Then, the press ram portion 41 is descended to insert the pull stud 133 of the punch P inside the lock claws 59 by the ram cylinder 33, and the lock claws 59 are pulled up to lock the punch P by the locking cylinder 53, so that the plate presser 85 is descended to position the punch P at the working height position by the plate presser vertical movement cylinder (not shown) (refer to FIG. 9).

Further, the ascending/descending member 97 is ascended to position the die D at the working height position by the ascending/descending motor 105 (refer to FIG. 9), and the punch P is rotated by an unillustrated indexing motor, as needed, and the die D is rotated by the indexing motor 119.

When the punch P and the die D are moved vertically between the working height positions and the punch and die set exchanging height positions to be positioned in this manner, locking and unlocking of the punch P and the die D are performed, so that shortening of a punch and die set exchanging time can be achieved.

Figure 30:
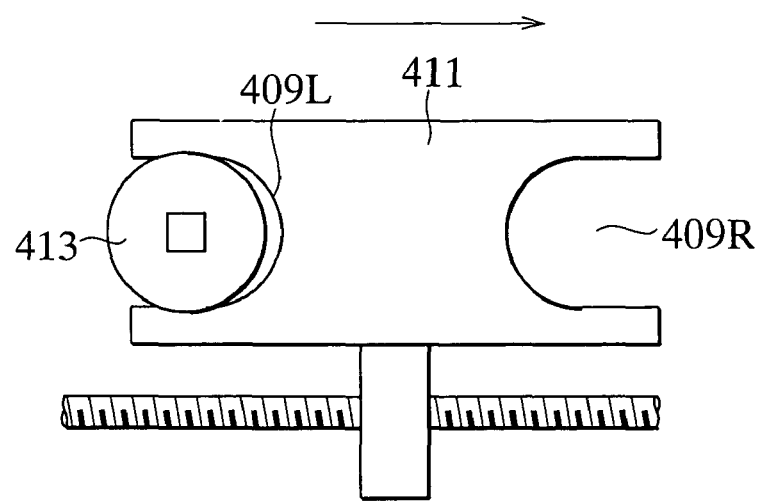
FIG. 30 is a plan view showing another embodiment of a punch and die set exchanging hand.

Incidentally, this invention is not limited to the above-described embodiment of the invention but it can be implemented with another embodiment by conducting proper modification. That is, in the above-described embodiment, attaching and detaching of a punch and die set have been conducted according to the steps shown in FIG. 29A to FIG. 29D. Besides, the attaching and detaching can be conducted by moving a punch and die set exchanging hand 411 having punch and die set grasping portions 409L and 409R on left and right sides to left and right sides by a moving mechanism, as shown in FIG. 30. For example, as an example of one direction or the other direction, the used die can be detached by the empty punch and die set grasping portion 409R on the right side and a punch and die set 413 grasped by the punch and die set grasping portion 409L on the left side can newly be attached by conducting movement to the right direction in FIG. 30, so that shortening of a punch and die set exchanging time can be achieved.

Figure 31:
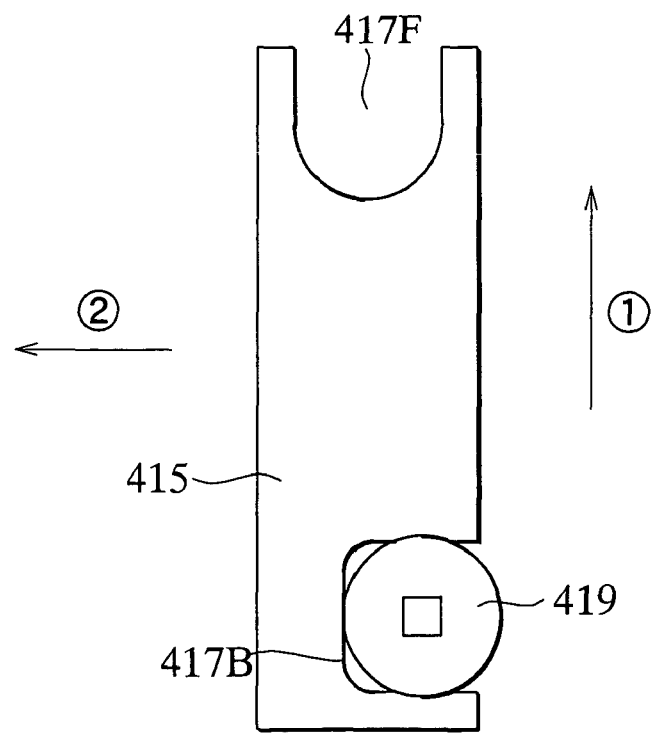
FIG. 31 is a plan view showing still another embodiment of a punch and die set exchanging hand.

As shown in FIG. 31, also, such a constitution may be employed that punch and die set grasping portions 417F, 417B are provided on front and back (up and down in FIG. 31) both sides of a punch and die set exchanging hand 415, and after the punch and die set exchanging hand 415 is advanced so that the used die is pushed out forward and detached by the empty punch and die set grasping portion 417F on the front side and the punch and die set exchanging hand 415 is further advanced so that a die 419 grasped by the die grasping portion 417B on the back side is newly attached, the punch and die set exchanging hand 415 is moved to the left side in FIG. 31. Even in this case, since the used punch and die set can be detached by the empty punch and die set grasping portion 417F, 417B on the front side and the die 419 grasped by the punch and die set grasping portion 417F on the front side can be newly attached, shortening of a punch and die set exchanging time can be achieved.

The invention claimed is:

1. A punch press, comprising:
an upper portion main shaft provided to be movable vertically and rotatable, the upper portion main shaft supporting a punch such that the punch is configured to be attached, detached and exchanged, the upper portion main shaft being provided with:
   a punch damper that includes lock claws having a spherical portion at a distal end thereof configured to vertically slide between a broad step portion at a lower end portion of a lower portion space of the upper portion main shaft and to elastically grasp the punch in a manner such that the spherical portion of the lock claws are moved inwardly by the step portion; and
   a plate presser supporting member movable vertically and configured to support a plate presser, the upper portion main shaft being provided with a fluid pressure cylinder coupled to and configured to vertically move the plate presser supporting member;
a lower portion main shaft provided to be movable vertically and rotatable, the lower portion main shaft supporting a die corresponding to the punch such that the die is configured to be attached, detached and exchanged, and the lower portion main shaft being provided with a fluid pressure cylinder configured to push the die up, and a piston rod in the fluid pressure cylinder is formed in a hollow shape configured to abut a lower face of the die;
a punch exchanging apparatus is configured to reciprocate between a punch accommodating section which accommodates the punch and the upper portion main shaft positioned at the punch exchanging height position; and
a die exchanging apparatus is configured to reciprocate between a die accommodating section which accommodates the die and the lower portion main shaft positioned at the die exchanging height position,
wherein
the upper portion main shaft is configured to ascend from a working height position, to perform press working on a work, to a punch exchange height position, to perform punch attaching, detaching and exchanging,
the lower portion main shaft is configured to descend from a working height position, to perform press working on a workpiece, to a die exchange height position, to perform die attaching, detaching and exchanging,
the punch press is configured to simultaneously detach and attach the punch and die, and
when the die exchanging apparatus is moved in one direction to a punch and die set attaching portion, holding a punch and die set supported by the punch and die set attaching portion with the punch and die set exchanging apparatus to detach the punch and die set from the punch and die set attaching portion and sequentially attaching a new punch and die set prepared and held by the punch and die set exchanging apparatus to the punch and die set attaching portion.

2. The punch press according to claim 1, wherein
the upper portion main shaft is provided with a pair of parallel punch engaging sections, the punch being configured to be detached from a corresponding engaging section by moving the punch from a first punch position to a second punch position or from the second punch position to the first punch position;
the lower portion main shaft is provided with a pair of parallel die engaging sections, the die being configured to be detached from a corresponding engaging section by moving the die from a first die position to a second die position or from the second die position to the first die position;
the punch exchanging apparatus is provided with a first punch holding section which holds a punch supported by the upper portion main shaft when the punch is moved from the first punch position to the second punch position or from the second punch position to the first punch position, and a second punch holding section which supports a next punch configured to be attached to the upper portion main body; and
the die exchanging apparatus is provided with a first die holding section which holds a die supported by the lower portion main shaft when the die is moved from the first die position to the second die position or from the second die position to the first die position, and a second die holding section which supports the next die to be attached to the lower portion main shaft.

3. The punch press according to claim 1, wherein the punch exchanging apparatus is provided with a punch conveying member configured to reciprocate between the punch accommodating section and the punch exchanging height position of the upper portion main shaft;
a punch holding arm provided with first and second punch holding sections, the punch holding arm being configured to reciprocate in a direction crossing a movement direction of the punch conveying member;
the die exchanging apparatus having a die conveying section configured to reciprocate between the die accommodating section and the die exchanging height position of the lower portion main shaft; and
a die holding arm having first and second die holding sections, the die holding arm being configured to reciprocate in a direction crossing a movement direction of the die conveying member.

4. The punch press according to claim 1, wherein the punch holding arm and the die holding arm are pivotably provided.

* * * * *